US010785960B2

(12) United States Patent
Komatsu et al.

(10) Patent No.: US 10,785,960 B2
(45) Date of Patent: Sep. 29, 2020

(54) INFORMATION PROCESSING SERVER, INFORMATION PROCESSING SYSTEM, AND SYSTEM PROCESSING METHOD

(71) Applicant: Sony Corporation, Tokyo (JP)

(72) Inventors: Hiromitsu Komatsu, Kanagawa (JP); Masakazu Yajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/093,173

(22) PCT Filed: Mar. 6, 2017

(86) PCT No.: PCT/JP2017/008645
§ 371 (c)(1),
(2) Date: Oct. 12, 2018

(87) PCT Pub. No.: WO2017/183328
PCT Pub. Date: Oct. 26, 2017

(65) Prior Publication Data
US 2019/0116764 A1    Apr. 25, 2019

(30) Foreign Application Priority Data
Apr. 21, 2016    (JP) .................................. 2016-085247

(51) Int. Cl.
*A01K 29/00*    (2006.01)
*A01K 11/00*    (2006.01)

(52) U.S. Cl.
CPC .......... *A01K 29/005* (2013.01); *A01K 11/004* (2013.01); *A01K 11/006* (2013.01); *A01K 29/00* (2013.01)

(58) Field of Classification Search
None
See application file for complete search history.

(56) References Cited

U.S. PATENT DOCUMENTS 9,226,481 B1 *   1/2016   Paripati ................. G06T 7/0004
10,212,922 B2    2/2019   Yajima et al.
(Continued)

FOREIGN PATENT DOCUMENTS

EP    2832214 A1    2/2015
EP    2833313 A1    2/2015
(Continued)

OTHER PUBLICATIONS

Written Opinion and English translation thereof dated Jun. 6, 2017 in connection with International Application No. PCT/JP2017/008645.
(Continued)

*Primary Examiner* — Curtis J King
(74) *Attorney, Agent, or Firm* — Wolf, Greenfield & Sacks, P.C.

(57) ABSTRACT

[Object] To provide an information processing server, an information processing system, and an information processing method capable of more appropriately managing domestic animals.
[Solution] An information processing server. A transmission signal, transmitted from a signal transmission device attached to a domestic animal and relayed to the information processing server by at least one or more signal relay devices installed to correspond to a rearing region of the domestic animal, includes a transmission device identifier for specifying the signal transmission device and a relay device identifier for specifying the signal relay device, the information processing server including: a control unit configured to determine whether or not the domestic animal stays in a rearing region corresponding to a rearing stage on a basis of the relay device identifier and individual information regarding the domestic animal corresponding to the transmission device identifier; and a notification information (Continued)

generation unit configured to generate notification information for controlling notification in an information terminal on a basis of the determination by the control unit.

20 Claims, 25 Drawing Sheets

(56) References Cited

U.S. PATENT DOCUMENTS

| | | | | |
|---|---|---|---|---|
| 2007/0029381 A1* | 2/2007 | Braiman | A01K 29/005 |
| | | | 235/385 |
| 2008/0202444 A1* | 8/2008 | Stenzel | A01K 1/0209 |
| | | | 119/480 |
| 2009/0058730 A1* | 3/2009 | Geissler | A01K 11/004 |
| | | | 342/450 |
| 2011/0102154 A1* | 5/2011 | Hindhede | A01K 29/005 |
| | | | 340/10.1 |
| 2012/0238912 A1* | 9/2012 | Rajkondawar | A01K 29/005 |
| | | | 600/588 |
| 2012/0239303 A1* | 9/2012 | Rajkondawar | A01K 29/005 |
| | | | 702/19 |
| 2017/0006838 A1* | 1/2017 | Brayer | A01J 5/007 |
| 2018/0242515 A1 | 8/2018 | Yajima et al. | |
| 2018/0279583 A1 | 10/2018 | Yajima et al. | |
| 2018/0295809 A1 | 10/2018 | Yajima et al. | |
| 2019/0133087 A1 | 5/2019 | Yajima et al. | |
| 2019/0163941 A1 | 5/2019 | Niikura et al. | |
| 2019/0183436 A1 | 6/2019 | Yajima et al. | |

FOREIGN PATENT DOCUMENTS

| | | |
|---|---|---|
| JP | 2005-304307 A | 11/2005 |
| JP | 2008-073005 A | 4/2008 |
| WO | WO 2013/145303 A1 | 10/2013 |
| WO | WO 2013/145322 A1 | 10/2013 |

OTHER PUBLICATIONS

International Preliminary Report on Patentability and English translation thereof dated Nov. 1, 2018 in connection with International Application No. PCT/JP2017/008645.

International Search Report and English translation thereof dated Jun. 6, 2017 in connection with International Application No. PCT/JP2017/008645.

* cited by examiner

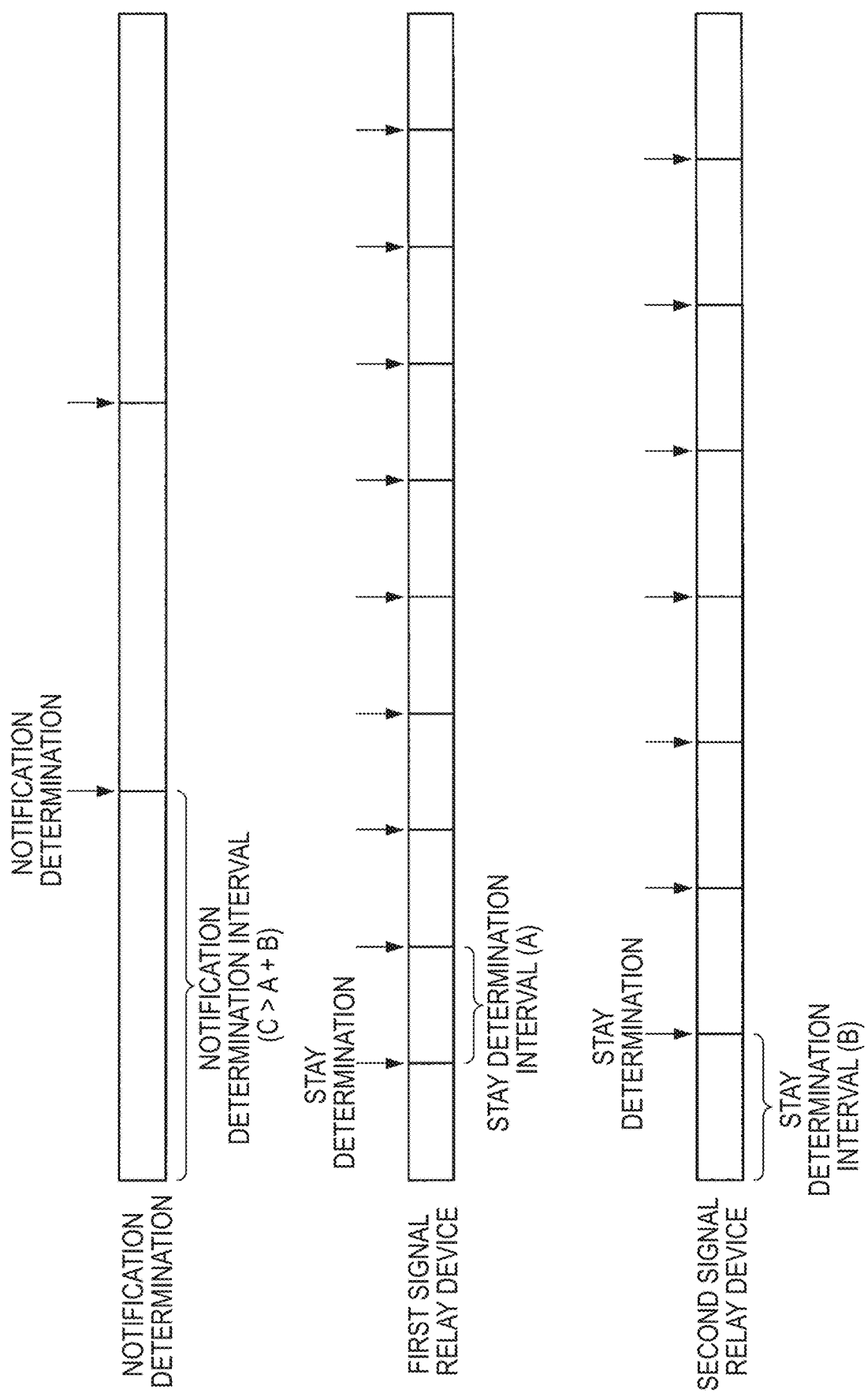

FIG. 7A

| ITEM | DESCRIPTION |
|---|---|
| INDIVIDUAL IDENTIFICATION NUMBER | INDIVIDUAL IDENTIFICATION NUMBER |
| NICKNAME | NAME OF COW |
| DATE OF BIRTH | DATE ON WHICH COW IS BORN |
| AGE OF MOON | NUMERICAL VALUE OBTAINED BY CALCULATING NUMBER OF DAYS FROM DATE OF BIRTH TO TODAY AND EXPRESSING UP TO FIRST DECIMAL PLACE OF NUMBER CALCULATED BY DIVIDING CALCULATED NUMBER OF DAYS BY 30 |
| INDIVIDUAL IDENTIFICATION NUMBER OF FATHER BULL | INDIVIDUAL IDENTIFICATION NUMBER OF FATHER BULL |
| NICKNAME OF FATHER BULL | NAME OF FATHER BULL |
| INDIVIDUAL IDENTIFICATION NUMBER OF MOTHER COW | INDIVIDUAL IDENTIFICATION NUMBER OF MOTHER COW |
| NICKNAME OF MOTHER COW | NAME OF MOTHER COW |

FIG. 7B

| ITEM | DESCRIPTION |
|---|---|
| ESTROUS SIGN | RESULT OBTAINED BY EVALUATING 4 STAGES OF NO, WEAK, INTERMEDIATE, AND STRONG STAGES |
| FERTILIZATION INFORMATION | INFORMATION REGARDING DATE ON WHICH FERTILIZATION IS CARRIED OUT, NUMBER OF TIMES FERTILIZATION IS CARRIED OUT FROM FINAL DELIVERY, BULL FOR FERTILIZATION, AND LIKE |
| PREGNANCY DIAGNOSIS INFORMATION | INFORMATION REGARDING RESULT OBTAINED BY CARRYING OUT PREGNANCY DIAGNOSIS AND DATE ON WHICH PREGNANCY DIAGNOSIS IS CARRIED OUT |
| SEX DETERMINATION INFORMATION | RESULT OF SEX DISCRIMINATION OF EMBRYO |
| NON-LACTATION INFORMATION | INFORMATION REGARDING SCHEDULE OF NON-LACTATION PERIOD CALCULATED FROM EXPECTED DATE OF DELIVERY OR WHETHER OR NOT COW IS CURRENTLY IN NON-LACTATING STATE |
| NON-PREGNANT DAYS | NUMBER OF DAYS FROM FINAL DELIVERY DATE TO DATE ON WHICH PREGNANCY DIAGNOSIS IS POSITIVE |
| DELIVERY INFORMATION | INFORMATION REGARDING DATE OF DELIVERY IN PAST PREGNANCY, EXPECTED DATE OF DELIVERY, AND DELIVERY INTERVAL |

FIG. 9

| ITEM | DESCRIPTION |
|---|---|
| NAME | NAME OF REARING REGION SET BY USER |
| STATUS INFORMATION | STATUS INFORMATION REGARDING DOMESTIC ANIMALS REARED IN REARING REGION |
| RELAY DEVICE IDENTIFIER | IDENTIFICATION NUMBER OF SIGNAL RELAY DEVICE INSTALLED IN REARING REGION |
| COMBINATION OF SIGNAL RELAY DEVICES | INFORMATION FOR DEFINING WHETHER DETERMINATION IS PERFORMED IN UNION SET INTERSECTION SET IN CASE IN WHICH PLURALITY OF SIGNAL RELAY DEVICES ARE USED |

FIG. 10

| ITEM | DESCRIPTION |
|---|---|
| IDENTIFIER | IDENTIFICATION NUMBER OF SIGNAL RELAY DEVICE |
| NAME | NAME OF SIGNAL RELAY DEVICE SET BY USER |
| LATITUDE AND LONGITUDE | POSITIONAL INFORMATION OF INSTALLATION LOCATION OF SIGNAL RELAY DEVICE |
| THRESHOLD OF RADIO WAVE INTENSITY | THRESHOLD OF RADIO WAVE INTENSITY OF SIGNAL USED FOR DETERMINATION |
| STAY DETERMINATION INTERVAL | TIME INTERVAL AT WHICH STAY OF DOMESTIC ANIMAL IS DETERMINED |
| IDENTIFICATION INFORMATION REGARDING REARING REGION | IDENTIFICATION NUMBER OF REARING REGION IN WHICH SIGNAL RELAY DEVICE IS INSTALLED |
| NAME OF REARING REGION | NAME OF REARING REGION IN WHICH SIGNAL RELAY DEVICE IS INSTALLED |

FIG. 11

| ITEM | DESCRIPTION |
|---|---|
| IDENTIFIER | IDENTIFICATION NUMBER OF ALERT NOTIFICATION |
| NAME | NAME OF ALERT NOTIFICATION SET BY USER |
| NOTIFICATION DETERMINATION INTERVAL | TIME INTERVAL AT WHICH DETERMINATION OF ALERT NOTIFICATION IS PERFORMED |
| DETERMINATION EFFECTIVE PERIOD OF TIME | PERIOD OF TIME AT WHICH DETERMINATION OF ALERT NOTIFICATION IS PERFORMED |
| STATUS INFORMATION OF TARGET COW | STATUS INFORMATION REGARDING TARGET DOMESTIC ANIMAL |
| INDIVIDUAL IDENTIFICATION NUMBER OF TARGET COW | INPUT INDIVIDUAL IDENTIFICATION NUMBER OF DOMESTIC ANIMAL IN CASE IN WHICH TARGET DOMESTIC ANIMAL IS DESIGNATED |
| ALERT DIRECTION | INFORMATION FOR DEFINING WHETHER ALERT IS GIVEN WHEN TARGET DOMESTIC ANIMAL IS ABSENT OR WHETHER ALERT IS GIVEN WHEN DOMESTIC ANIMAL OTHER THAN TARGET DOMESTIC ANIMAL IS PRESENT |

FIG. 19

| | |
|---|---|
| ← #1020 | 📶 🔋 13:00 |
| STATUS | MILKING |
| CURRENT BARN | |
| GRAZING | 17:00 |
| BASIC INFORMATION | |
| TAG ID | #1020 |
| INDIVIDUAL IDENTIFICATION NUMBER | 113901020 |
| NICKNAME | WIN BIRTH |
| DATE OF BIRTH | 2010.5.10 |
| FATHER BULL | #2023 |
| | YOUNG SKY |
| MOTHER COW | #3025 |
| | GREEN EARTH |

FIG. 20

[Screen 1]
← BARN (AREA)
MILKING BARN
NON-LACTATION (HOLIDAY) BARN
NURTURING BARN
ADD BARN (AREA) +

[Screen 2]
✓ MILKING BARN
BARN NAME          MILKING BARN
STAYING COW        MILKING COW
RELAY DEVICES
12356
12357
ADD RELAY DEVICE +
TEST COMMUNICATION OF RELAY DEVICES

[Screen 3]
✓ MILKING BARN
PLEASE ADJUST SENSITIVITY OF EACH RELAY DEVICE SO THAT NUMBER OF COWS IS 0 IN CASE IN WHICH COW IN DIFFERENT LOCATION IS DETECTED.
SUM OF DETECTED COWS    MILKING COW 90 COWS/100 COWS    NON-LACTATION COW 8 COWS/20 COWS
                        NURTURING COW 0 COWS/20 COWS
                        HOLIDAY COW 0 COWS/20 COWS
RELAY DEVICE NAME    12356
SENSITIVITY  WEAK ←———●——→ STRONG
DETECTED COWS    MILKING COW 30 COWS    NON-LACTATION COW 8 COWS
                 NURTURING 0 COWS       HOLIDAY COW 0 COWS
RELAY DEVICE NAME    12357
SENSITIVITY  WEAK ←———●——→ STRONG
DETECTED COWS    MILKING COW ○ NON-LACTATION COW ○
                 NURTURING    ○ HOLIDAY COW

23 SEPTEMBER MONDAY

☐ COW #1234 HAS BEEN
REGISTERED AS
NON-LACTATION COW

INFORMATION PROCESSING SERVER, INFORMATION PROCESSING SYSTEM, AND SYSTEM PROCESSING METHOD

CROSS-REFERENCE TO RELATED APPLICATIONS

This application is a U.S. National Stage entry under 35 U.S.C. § 371 of International Application No. PCT/JP2017/008645, filed in the Japan Patent Office on Mar. 6, 2017, which claims priority to Japanese Patent Application No. 2016-085247, filed in the Japan Patent Office on Apr. 21, 2016, each application of which is incorporated by reference herein in its entirety.

TECHNICAL FIELD

The present disclosure relates to an information processing server, an information processing system, and an information processing method.

BACKGROUND ART

With increases in sizes of livestock industries, technologies for appropriately managing domestic animals have been requested. Specifically, technologies for ascertaining residence of domestic animals reared in grazing lands set by fences and the like stalls segmented in barns, or the like are requested.

For example, the following Patent Literature 1 discloses a technology for managing domestic animals using positional information by Global Navigation Satellite System (GNSS).

CITATION LIST

Patent Literature

Patent Literature 1: JP 2008-73005A

DISCLOSURE OF INVENTION

Technical Problem

However, in the technology disclosed in the foregoing Patent Literature 1, it was difficult to separately manage each domestic animal in accordance with an age of the moon, a sex, a species, a reproductive cycle, and the like.

In view of the foregoing circumstances, the present disclosure proposes an information processing server, an information processing system, and an information processing method that make it possible to more appropriately manage domestic animals.

Solution to Problem

According to the present disclosure, there is provided an information processing server. A transmission signal, transmitted from a signal transmission device attached to a domestic animal and relayed to the information processing server by at least one or more signal relay devices installed to correspond to a rearing region of the domestic animal, includes a transmission device identifier for specifying the signal transmission device and a relay device identifier for specifying the signal relay device, the information processing server includes: a control unit configured to determine whether or not the domestic animal stays in a rearing region corresponding to a rearing stage on a basis of the relay device identifier and individual information regarding the domestic animal corresponding to the transmission device identifier; and a notification information generation unit configured to generate notification information for controlling notification in an information terminal on a basis of the determination by the control unit.

In addition, according to the present disclosure, there is provided an information processing system including: a signal transmission device attached to a domestic animal and configured to transmit a transmission signal including a transmission device identifier; at least one or more signal relay devices installed to correspond to a rearing region of the domestic animal and configured to add a relay device identifier to the received transmission signal to relay the transmission signal to an information processing server; and the information processing server including a control unit configured to determine whether or not the domestic animal stays in a rearing region corresponding to a rearing stage on a basis of the relay device identifier and individual information regarding the domestic animal corresponding to the transmission device identifier, and a notification information generation unit configured to generate notification information for controlling notification in an information terminal on a basis of the determination by the control unit.

In addition, according to the present disclosure, there is provided an information processing method. A transmission signal, transmitted from a signal transmission device attached to a domestic animal and relayed to an information processing server by at least one or more signal relay devices installed to correspond to a rearing region of the domestic animal, includes a transmission device identifier for specifying the signal transmission device and a relay device identifier for specifying the signal relay device, the information processing method including: determining whether or not the domestic animal stays in a rearing region corresponding to a rearing stage, by an arithmetic processing device, on a basis of the relay device identifier and individual information regarding the domestic animal corresponding to the transmission device identifier; and generating notification information for controlling notification in an information terminal on a basis of the determination.

According to the present disclosure, the signal relay device installed in each region such as a pasture can ascertain the positions of domestic animals to which the signal transmission devices are attached by receiving signals from the signal transmission devices. In addition, according to the present disclosure, it is possible to determine whether or not the domestic animal stays in the rearing region corresponding to the rearing stage on the basis of the individual information regarding the domestic animal to which the signal transmission device is attached and perform notification or the like to a user on the basis of the determination.

Advantageous Effects of Invention

According to the present disclosure, as described above, it is possible to more appropriately manage domestic animals.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram illustrating a relation between an interval of determination by a notification determination unit and an interval of determination by a stay determination unit.

FIG. 7A is a table illustrating basic information among pieces of individual information regarding a domestic animal.

FIG. 7B is a table illustrating information regarding breeding among the individual information regarding the domestic animal.

FIG. 9 is a table illustrating an example of information regarding a rearing region corresponding to a rearing stage.

FIG. 10 is a table illustrating an example of information regarding the signal relay device.

FIG. 11 is a table illustrating an example of information regarding notification determination condition.

FIG. 19 is an explanatory diagram illustrating an example of display of individual information of a domestic animal.

FIG. 20 is an explanatory diagram illustrating an example of display for controlling a threshold of a radio wave intensity of a transmission device identification signal.

FIG. 23 is an explanatory diagram illustrating an example of display for notifying that status information of cattle is changed.

MODE(S) FOR CARRYING OUT THE INVENTION

Figure 1:
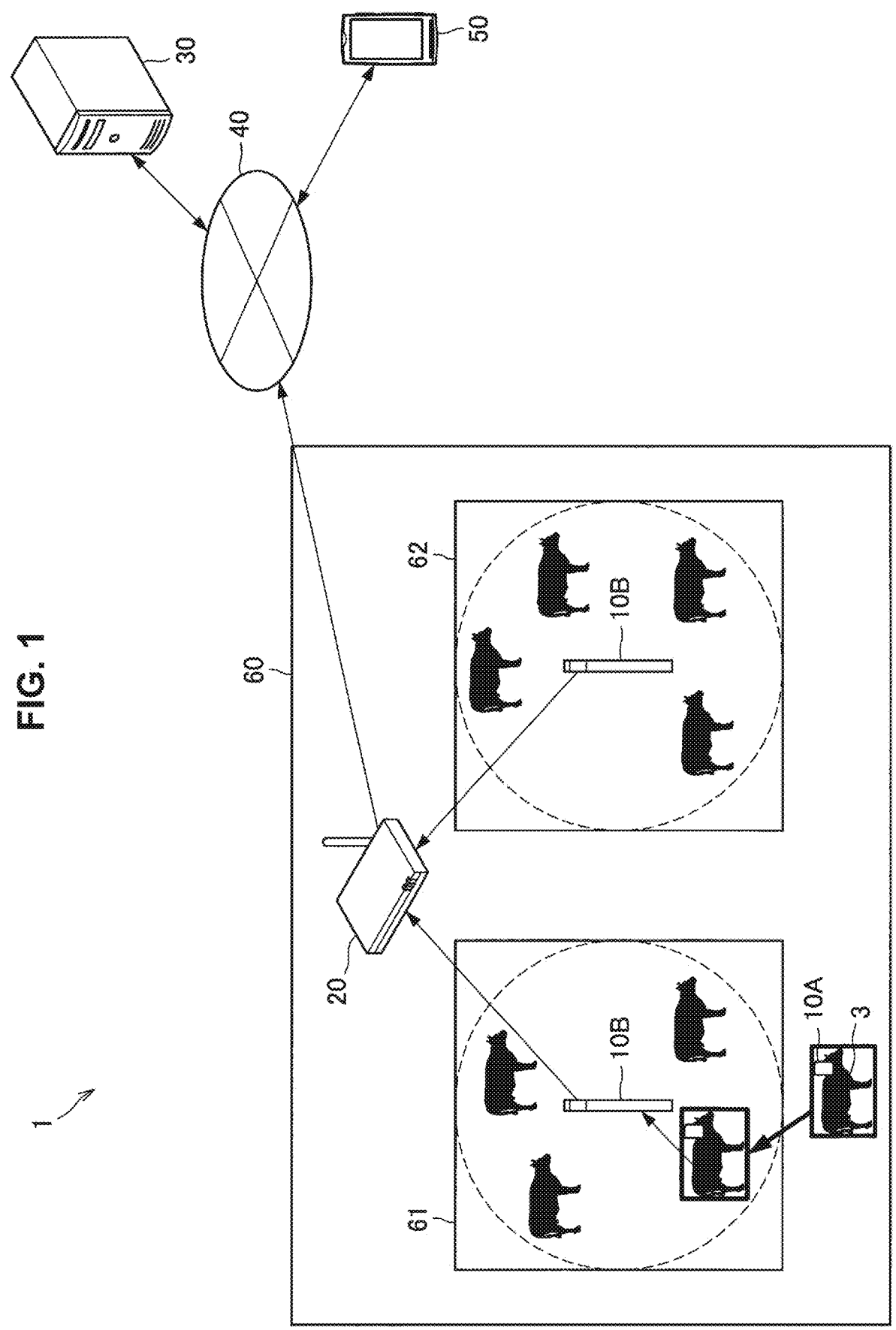
FIG. 1 is an explanatory diagram illustrating an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Information processing system
1.1. Overview of information processing system
1.2. Configuration of information processing system
1.3. Modification example
2. Information processing server
2.1. Configuration of information processing server
2.2. Operation of information processing server
2.3. Display example in information terminal
2.4. Hardware configuration of information processing server
3. Conclusion

1. Information Processing System

1.1. Overview of Information Processing System

First, an overview of an information processing system according to an embodiment of the present disclosure will be described with reference to FIG. 1. FIG. 1 is an explanatory diagram illustrating an overview of an information processing system 1 according to the embodiment.

As illustrated in FIG. 1, in the information processing system 1, a signal relay device 10B installed to correspond to each of rearing regions (for example, barn 61 and 62 and the like) corresponding to a rearing stage of a pasture 60 receives a signal transmitted by a signal transmission device 10A attached to a domestic animal 3 and transmits the signal to an information processing server 30 via the communication network connection device 20.

For example, the domestic animals 3 may be animals in industry such as beef cattle, milk cows, pigs, horses, sheep, goats, domestic fowls or may be pets such as dogs, cats, and rabbits. For example, the domestic animals 3 are reared in rearing regions such as the barns 61 and 62 or the like of the pasture 60. In addition, the domestic animals 3 are reared and managed differently in each rearing region on the basis of individual information such as an age of the moon, a sex, a species, a healthy state, and a reproductive cycle. Note that in the present specification, a case in which the domestic animals 3 are milk cows will be mainly described.

A signal arriving at the information processing server 30 includes a transmission device identifier for specifying the signal transmission device 10A which has transmitted the signal and a relay device identifier for specifying the signal relay device 10B which has received the signal. Accordingly, the information processing server 30 can determine a rearing region in which the domestic animals 3 to which the signal transmission devices 10A are attached stay by determining from which signal relay device 10B a signal transmitted by the signal transmission device 10A is received.

Specifically, in a case in which the domestic animal 3 to which the signal transmission device 10A is attached enters the barn 61, the signal transmission device 10A transmits a signal including a transmission device identifier for specifying the signal transmission device 10A itself, and then the transmitted signal is received by the signal relay device 10B of which a communicable region is the inside of the barn 61. The signal relay device 10B adds a relay device identifier for specifying the signal relay device 10B itself to the received signal and transmits the added signal to the information processing server 30. The information processing server 30 determines whether or not the domestic animal 3 stays in the rearing region corresponding to the rearing stage on the basis of the relay device identifier and the individual information regarding the domestic animal 3 (that is, the domestic animal 3 to which the signal transmission device 10A is attached) corresponding to the transmission device identifier included in the received signal.

For example, the information processing server 30 can detect that the domestic animal 3 enters in a case in which the domestic animal 3 to which the signal transmission device 10A is attached enters another barn 61 not corresponding to the rearing stage of this domestic animal 3. In this case, the information processing server 30 may notify an information terminal 50 manipulated by a user of an alert or the like.

The information processing system 1 can ascertain the rearing region in which the domestic animal 3 corresponding to the signal transmission device 10A (that is, the domestic animal 3 to which the signal transmission device 10A is attached) stays by ascertaining the position of each signal transmission device 10A in accordance with the transmission device identifier and the relay device identifier included in the signal. In addition, the information processing system 1 can manage each domestic animal 3 in accordance with the rearing stage of the domestic animal 3 by further using the individual information of the domestic animal 3 corresponding to the signal transmission device 10A.

Note that hereinafter, information for specifying the signal transmission device 10A is referred to as a transmission device identifier and a signal that includes the transmission device identifier and is transmitted from the signal transmission device 10A is referred to as a transmission device identification signal. In addition, information for specifying the signal relay device 10B is referred to as a relay device identifier and a signal that includes the relay device identifier and is transmitted from the signal relay device 10B is referred to as a relay device identification signal.

1.2. Configuration of Information Processing System

Figure 2:
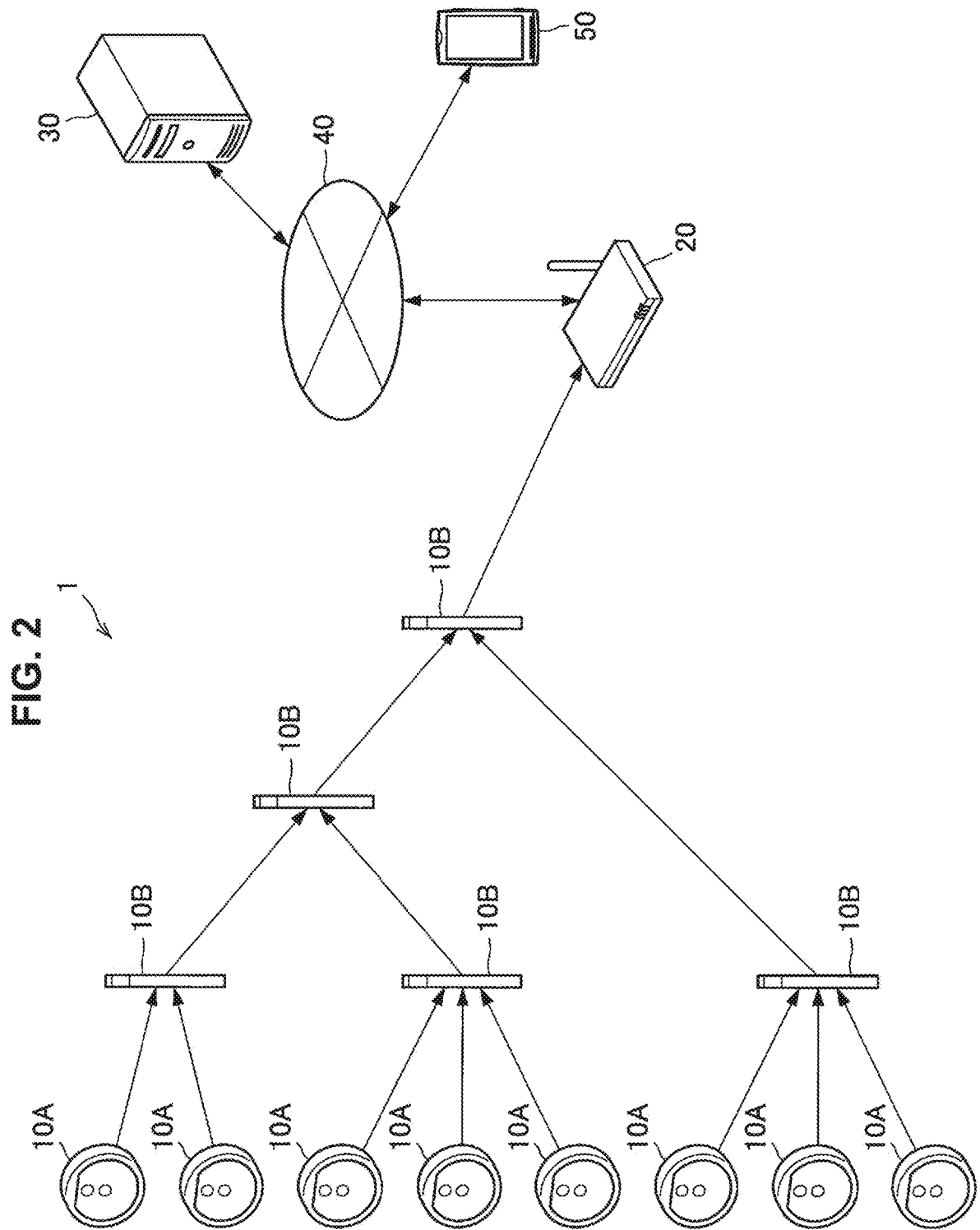
FIG. 2 is an explanatory diagram illustrating a configuration of the information processing system according to the embodiment.

Next, a configuration of the information processing system 1 according to the embodiment will be described with reference to FIG. 2. FIG. 2 is an explanatory diagram illustrating a configuration of the information processing system 1 according to the embodiment.

As illustrated in FIG. 2, the information processing system 1 includes the signal transmission devices 10A, the signal relay devices 10B, a communication network connection device 20, an information processing server 30, and the information terminal 50.

The signal transmission device 10A is attached to each domestic animal 3 and transmits a transmission device identification signal at a predetermined timing (for example, every tens of seconds). The transmission device identification signal transmitted by the signal transmission device 10A includes a transmission device identifier for specifying the signal transmission device 10A, and thus the information processing system 1 can identify each signal transmission device 10A and each domestic animal 3 to which the signal transmission device 10A is attached in accordance with the transmission device identifier.

For example, the signal transmission device 10A may be an identification tag attached to an ear or the like of the domestic animal 3. Note that the signal transmission device 10A may be directly attached to the domestic animal 3 by pasting, implanting, or the like the signal transmission device 10A on an organism of the domestic animal 3 or may be indirectly attached to the domestic animal 3 via an accessory or the like.

In addition, the signal transmission device 10A may include a power generation device that generates power in accordance with a surrounding environment or the like and may transmit the transmission device identification signal in a case in which an amount of power generated by the power generation device reaches a predetermined amount. Thus, since the signal transmission device 10A can transmit the transmission device identification signal even when a battery or the like is not included, it is possible to improve portability and reduce a load on the domestic animal 3. In addition, in the signal transmission device 10A, a labor for managing an attached battery can be omitted.

The signal relay devices 10B are installed in predetermined regions (for example, the barns 61 and 62 or the like) of the pasture 60 and receive the transmission device identification signals from the signal transmission devices 10A. In addition, the signal relay device 10B transmits the relay device identification signal in which the relay device identifier for specifying the signal relay device 10B is granted to the received transmission device identification signal, to the communication network connection device 20. At this time, the relay device identification signal may be directly transmitted to the communication network connection device 20 or may be transmitted to the communication network connection device 20 via at least one or more of the other signal relay devices 10B.

For example, the signal relay device 10B may be a dedicated communication device with a columnar shape, as illustrated in FIG. 2, may be a communication device that has a similar configuration as the signal transmission device 10A, or may be a general portable communication terminal such as a mobile phone and a smartphone.

The communication network connection device 20 transmits the relay device identification signal transmitted from each signal relay device 10B to the information processing server 30 via the communication network 40. The communication network connection device 20 may be a communication device that includes a wired or wireless communication device when connection to the communication network 40 is possible. For example, the communication network connection device 20 may be a gateway device which can be connected to a wireless or wireless local area network (LAN) or a mobile communication terminal which can be connected to a mobile communication network.

The communication network 40 is a network in which information is transmitted and received. The communication network 40 may be, for example, the Internet, a satellite communication network, a telephone line network, a mobile communication network (for example, 3G line network or the like), or the like.

Here, a communication scheme for the transmission device identification signal transmitted from the signal transmission device 10A may be different in at least a frequency or a communication mode from a communication scheme for the relay device identification signal transmitted from the signal relay device 10B. In this case, the signal relay device 10B and the communication network connection device 20 easily distinguish at least one of the frequency and the communication mode of the transmission device identification signal and the relay device identification signal. Thus, the signal relay device 10B and the communication network connection device 20 can prevent the transmission device identification signal and the relay device identification signal from being crossed.

In addition, the communication scheme for the transmission device identification signal transmitted from the signal transmission device 10A may have a communicable range that reaches the entire rearing region such as the barn corresponding to the signal relay device 10B. For example, the signal relay device 10B is installed in each predetermined rearing region corresponding to the rearing stage, such as each barn, a grazing field, and a milking box. Therefore, the information processing server 30 can be caused to correspond to the signal relay device 10B and the rearing region corresponding to the rearing stage. Thus, the information processing server 30 supposes that reception of the transmission device identification signal from the signal transmission device 10A by the signal relay device 10B is entering of the domestic animal 3 to which the signal transmission device 10A is attached into the rearing region corresponding to the signal relay device 10B. Note that the predetermined rearing region corresponding to the rearing stage may be entirely covered by the communicable range of one signal relay device 10B or may be entirely covered by combining the communicable ranges of the plurality of signal relay devices 10B.

The communication scheme for the relay device identification signal transmitted from the signal relay device 10B is not particularly limited and any communication scheme may be used. For example, the communication scheme for the relay device identification signal may be a wireless communication scheme or a wired communication scheme.

The information processing server 30 receives a signal transmitted from the signal transmission device 10A and relayed to the signal relay device 10B. In addition, the information processing server 30 determines whether or not the rearing region in which the domestic animal 3 stays is the rearing region corresponding to the rearing stage on the basis of the relay device identifier included in the received signal and the individual information regarding the domestic animal 3 corresponding to the transmission device identifier included in the received signal.

Further, for example, in a case in which the rearing region in which the domestic animal 3 stays is not the rearing region corresponding to the rearing stage and a case in which the domestic animal 3 does not stay in the rearing region corresponding to the rearing stage, the information processing server 30 transmits, to the information terminal 50, notification information for controlling display for notifying that the rearing region in which the domestic animal 3 stays is not the rearing region corresponding to the rearing stage and the domestic animal 3 does not stay in the rearing region corresponding to the rearing stage. Thus, the information processing server 30 can notify a user who manages the domestic animals 3 of mismatch between the rearing region in which the domestic animal 3 stays and the rearing region corresponding to the rearing stage of the domestic animal 3.

The information terminal 50 is an information processing device carried by the user who manages the domestic animals 3. The information terminal 50 receives, from the information processing server 30, the notification information for notifying that the rearing region in which the domestic animal 3 stays does not match the rearing region corresponding to the rearing stage of the domestic animal 3 and generates display for presenting the notification to the user on the basis of the notification information. The notification information received by the information terminal 50 includes, for example, content of the notification and information for specifying the domestic animal 3 corresponding to the notification.

In the information processing system 1 according to the embodiment, for example, in a case in which the rearing region in which the domestic animal 3 stays does not match the rearing region corresponding to the rearing stage of the domestic animal 3, the user who manages the domestic animals 3 can view display for notifying the mismatch on the information terminal 50. Accordingly, in the information processing system 1 according to the embodiment, the user who manages the domestic animals 3 can more easily manage the domestic animals 3.

Figure 3:
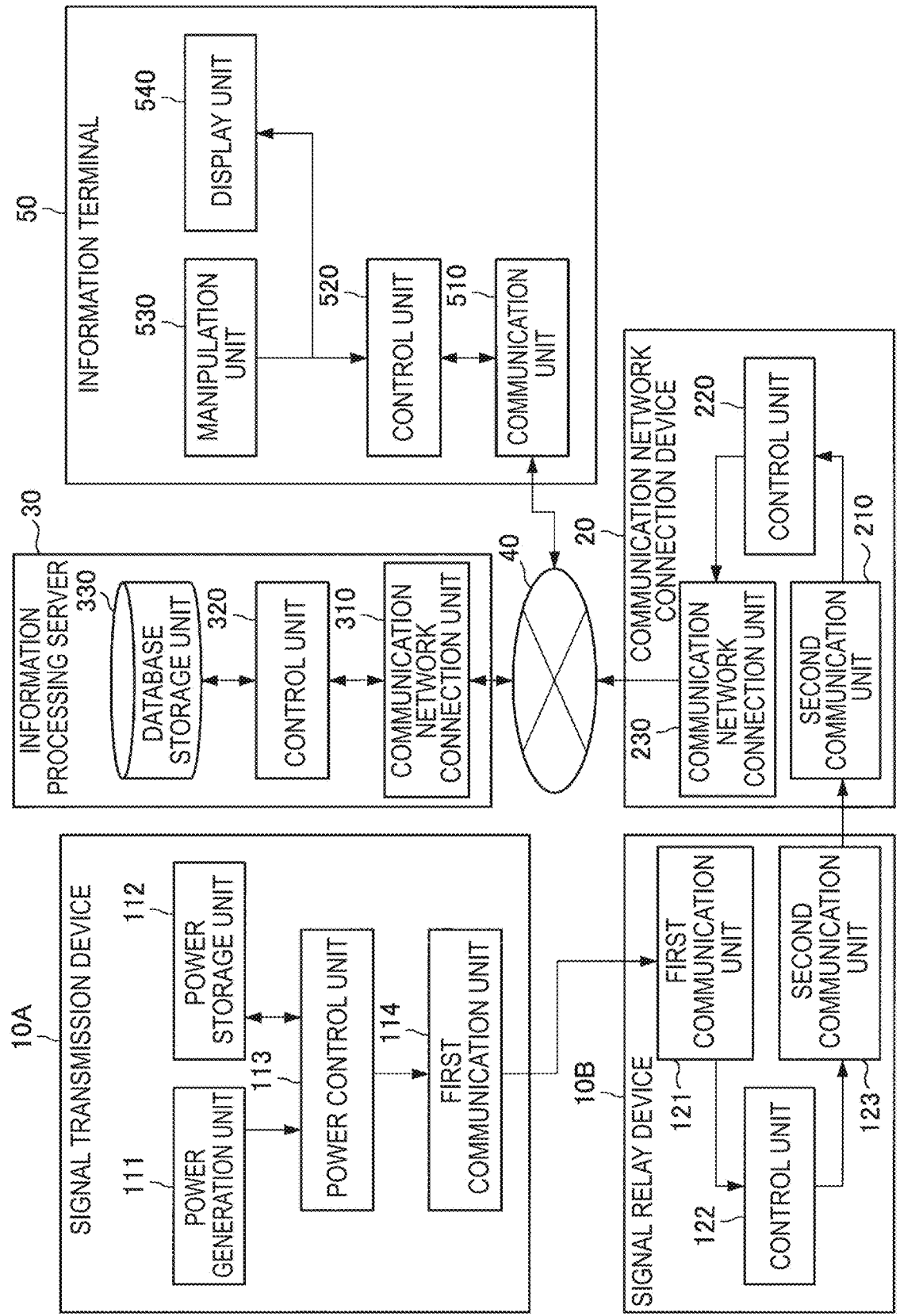
FIG. 3 is a block diagram illustrating a functional configuration of the information processing system according to the embodiment.

Next, a more specific configuration of the information processing system 1 according to the embodiment will be described with reference to FIG. 3. FIG. 3 is a block diagram illustrating a functional configuration of the information processing system 1 according to the embodiment.

(Signal Transmission Device 10A)

As illustrated in FIG. 3, the signal transmission device 10A includes a power generation unit 111, a power storage unit 112, a power control unit 113, and a first communication unit 114.

The power generation unit 111 is a power generation device that generates power in accordance with a surrounding environment of the signal transmission device 10A. Specifically, the power generation unit 111 may be one device or a plurality of devices among various power generation devices such as a vibration power generation device, a photovoltaic generation device, a thermoelectric conversion power generation device, an enzyme power generation device, a power generation device using radio waves, and a power generation device using a near electromagnetic field. The signal transmission device 10A includes the power generation unit 111, and thus can transmit the transmission device identification signal using the power generated by the power generation unit 111 although a power source such as a battery is not included.

Note that a vibration power generation device is a power generation device that includes an electrostatic type, electromagnetic type, magnetostrictive type of power generation element and generates power using vibration. The photovoltaic generation device is a power generation device that generates power using solar light or indoor light. The thermoelectric conversion power generation device is a power generation device that includes a power generation element using the Seebeck effect or a Thomson effect, a thermoelectronic power generation element, or a thermomagnetic power generation element and generates power using heat, a temperature difference, or the like. The enzyme power generation device is a power generation device that generates power by decomposing carbohydrate (for example, glucose or the like) contained in an organic substance by an enzyme. The power generation device using radio waves is a power generation device that generates power using radio waves such as Wi-Fi or terrestrial digital waves and the power generation device using a near electromagnetic field is power generation device that generates power using electromagnetic waves of a near electric field.

The power storage unit 112 stores the power generated by the power generation unit 111. The power stored in the power storage unit 112 is used, for example, to operate the first communication unit 114. The power storage unit 112 may be any one or a combination of a plurality of various secondary cells such as a lithium ion secondary cell, various capacitors such as an electric double layer capacitor and a lithium ion capacitor, and various capacitors such as a ceramic capacitor, a film capacitor, an aluminum electrolytic capacitor, and a tantalum capacitor.

The power control unit 113 controls supply of internal power of the signal transmission device 10A. Specifically, in a case in which the power storage unit 112 is charged with the power generated by the power generation unit 111 and the power stored in the power storage unit 112 reaches a predetermined amount, the power control unit 113 supplies power from the power storage unit 112 to the first communication unit 114. Thus, whenever the amount of power generated by the power generation unit 111 reaches the predetermined amount, the signal transmission device 10A can transmit the transmission device identification signal from the first communication unit 114. A timing at which the transmission device identification signal is transmitted from the signal transmission device 10A depends on an amount of generated power per unit time in the power generation unit 111, but may be every tens of seconds, for example.

The first communication unit 114 includes an antenna and a communication circuit and transmits the transmission device identification signal to the signal relay device 10B. Specifically, when the power stored in the power storage unit 112 reaches the predetermined amount, the first communication unit 114 transmits the transmission device identification signal including the transmission device identifier for specifying the signal transmission device 10A using the power stored in the power storage unit 112. The first communication unit 114 includes the antenna and the communication circuit that can perform mobile communication such as 3G or Long Term Evolution (LTE) or communication by a signal with a wavelength (for example, 920 MHz or the like) of a bandwidth of hundreds of MHz to tens of GHz such as Wi-Fi (registered trademark), ZigBee (registered trademark), Bluetooth (registered trademark), Bluetooth Low Energy (registered trademark), ANT (registered trademark), ANT+ (registered trademark), or EnOcean Alliance (registered trademark). Specifically, the first communication unit 114 may include an antenna and a communication circuit corresponding to Bluetooth Low Energy.

(Signal Relay Device 10B)

In addition, as illustrated in FIG. 3, the signal relay device 10B includes a first communication unit 121, a control unit 122, and a second communication unit 123.

The first communication unit 121 includes an antenna and a communication circuit and receives a signal transmitted from the signal transmission device 10A. For example, the first communication unit 121 may include an antenna and a communication circuit capable of receiving the transmission device identification signal transmitted from the first communication unit 114 of the signal transmission device 10A.

The control unit 122 controls each configuration of the signal relay device 10B. Specifically, the control unit 122 controls each configuration such that the relay device identifier for specifying the signal relay device 10B is added to the transmission device identification signal received by the first communication unit 121 to be transmitted as the relay device identification signal by the second communication unit 123. The control unit 122 may include a micro processing unit (MPU) which is an arithmetic processing device and a memory that stores identification information of the signal relay device 10B, a control program, a control parameter, and the like.

The second communication unit 123 includes an antenna and a communication circuit and transmits the relay device identification signal to the communication network connection device 20. Specifically, the second communication unit 123 transmits, to the communication network connection device 20, the relay device identification signal in which the relay device identifier for specifying the signal relay device 10B is added to the transmission device identification signal received by the first communication unit 121. Thus, the information processing server 30 receiving the relay device identification signal can identify the signal transmission device 10A having transmitted the transmission device identification signal and the signal relay device 10B having received the transmission device identification signal in accordance with the transmission device identifier and the relay device identifier included in the relay device identification signal.

In addition, the control unit 122 may add, to the transmission device identification signal, information regarding the radio wave intensity of the signal when the transmission device identification signal transmitted by the signal transmission device 10A is received by the first communication unit 121 and sets the transmission device identification signal as the relay device identification signal. Thus, the information processing server 30 can estimate a distance between the signal transmission device 10A and the signal relay device 10B on the basis of the radio wave signal of the transmission device identification signal, and therefore can ascertain the position of the signal transmission device 10A in more detail. In addition, the information processing server 30 can determine the position of the signal transmission device 10A more accurately by neglecting the transmission device identification signal of which the radio wave intensity is less than a threshold to remove a noise signal.

The second communication unit 123 includes the antenna and the communication circuit that can perform mobile communication such as 3G or Long Term Evolution (LTE) or communication by a signal with a wavelength (for example, 920 MHz or the like) of a bandwidth of hundreds of MHz to tens of GHz such as Wi-Fi, ZigBee, Bluetooth, Bluetooth Low Energy, ANT, ANT+, or EnOcean Alliance. In addition, the second communication unit 123 may include an antenna and a communication circuit in conformity with a communication scheme in which at least one of a frequency or a communication mode is different from that of the first communication unit 121. Thus, the signal relay device 10B can prevent the transmission device identification signal and the relay device identification signal from being crossed.

(Communication Network Connection Device 20)

In addition, as illustrated in FIG. 3, the communication network connection device 20 includes a second communication unit 210, a control unit 220, and a communication network connection unit 230.

The second communication unit 210 includes an antenna and a communication circuit and receives the relay device identification signal transmitted from the signal relay device 10B. Specifically, the second communication unit 210 may include an antenna and a communication circuit capable of receiving the relay device identification signal transmitted from the second communication unit 123 of the signal relay device 10B.

The control unit 220 controls each configuration of the communication network connection device 20. Specifically, the control unit 220 controls transmission and reception of a signal in the second communication unit 210 and the communication network connection unit 230. The control unit 220 may include an MPU which is an arithmetic processing device and a memory that stores a control program, a control parameter, and the like.

The communication network connection unit 230 transmits the relay device identification signal received by the second communication unit 210 to the information processing server 30. The communication network connection unit 230 may be a wired or wireless communication device as long as connection to the communication network 40 is possible. For example, the communication network connection unit 230 may be a wired or wireless LAN-compatible communication device, a cable communication device that performs wired cable communication, or may be a communication device that performs mobile communication.

(Information Processing Server 30)

Further, as illustrated in FIG. 3, the information processing server 30 includes a communication network connection unit 310, a control unit 320, and a database storage unit 330.

The communication network connection unit 310 includes a communication interface and a communication circuit which can be connected to the communication network 40 and receives a signal transmitted from the signal transmission device 10A via the communication network 40. The communication network connection unit 310 may be a wired or wireless communication device as long as the communication device can be connected to the communication network 40 and transmit and receive a signal via the communication network 40, as in the communication network connection unit 230 of the communication network connection device 20. For example, the communication network connection unit 310 may be a wired or wireless LAN-compatible communication device, a cable communication device that performs wired cable communication, or may be a communication device that performs mobile communication.

The control unit 320 includes an MPU which is an arithmetic processing device and a memory that stores a control program or the like and determines whether or not the domestic animal 3 stays in the rearing region corresponding the rearing stage on the basis of the relay device identifier included in the received relay device identifier signal and the individual information regarding the domestic animal 3 corresponding to the transmission device identifier. Specifically, the control unit 320 determines whether or not the domestic animal 3 stays in the rearing region corresponding to the rearing stage on the basis of status information included in the individual information regarding the domestic animal 3 corresponding to the transmission device identifier and status information set in the region corresponding to the signal relay device 10B specified with the relay device identifier. Here, the status information is information indicating the rearing stage of the domestic animal 3.

More specifically, the control unit 320 first extracts the individual information regarding the domestic animal 3 (that is, the domestic animal 3 to which the signal transmission device 10A is attached) corresponding to the transmission device identifier included in the received relay device identification information from the database storage unit 330. Subsequently, the control unit 320 extracts the status information set in the rearing region corresponding to the signal relay device 10B specified with the relay device identifier included in the received relay device identification signal from the database storage unit 330. Subsequently, the control unit 320 determines whether or not the extracted status information included in the individual information regarding the domestic animal 3 matches the status information set in the rearing region corresponding to the signal relay device 10B.

In a case in which the status information included in the individual information regarding the domestic animal 3 does not match the status information set in the rearing region, the control unit 320 determines that the domestic animal 3 enters an inappropriate rearing region. At this time, the control unit 320 can notify the user who manages the domestic animal 3 that the domestic animal 3 enters the inappropriate rearing region by transmitting, to the information terminal 50, notification information for controlling display for notifying the user that the domestic animal 3 enters the inappropriate rearing region.

Here, the rearing region corresponding to the rearing stage of the domestic animal 3 is a region in which the domestic animal 3 is reared in a stage based on an age of the moon, a sex, a species, a reproductive cycle, and the like. For example, each barn, a grazing field, a milking box, or the like can be exemplified.

In addition, in a case in which the transmission device identification signal is not received for a predetermined time from the signal transmission device 10A corresponding to the domestic animal 3 that has the status information matching the status information set in the rearing region, the control unit 320 determines that the domestic animal 3 does not stay in an appropriate rearing region. At this time, the control unit 320 can notify the user who manages the domestic animal 3 that the domestic animal 3 does not stay in the appropriate rearing region by transmitting, to the information terminal 50, notification information for controlling display for notifying the user that the domestic animal 3 does not stay in the appropriate rearing region.

In addition, the control unit 320 may control the individual information of the domestic animal 3 stored in the database storage unit 330. Specifically, the control unit 320 may rewrite the status information included in the individual information regarding the domestic animal 3 stored in the database storage unit 330 on the basis of an input or the like from the user who manages the domestic animal 3.

In addition, on the basis of the transmission device identifier included in the transmission device identification signal transmitted from the signal transmission device 10A, the control unit 320 may rewrite the status information included in the individual information regarding the domestic animal 3 stored in the database storage unit 330. At this time, on the basis of the rewritten status information regarding the domestic animal 3, the control unit 320 may determine whether or not the domestic animal 3 stays in the rearing region corresponding to the rearing stage. For example, in a case in which the relay device identification signal including the transmission device identifier corresponding to the domestic animal 3 that has specific status information and the relay device identifier for specifying a predetermined signal relay device 10B is received at a predetermined frequency, the control unit 320 may change the status information regarding the domestic animal 3 to which the signal transmission device 10A is attached to the status information regarding the rearing region corresponding to the signal relay device 10B.

The database storage unit 330 is a storage unit that stores a database including the individual information regarding the domestic animal 3, information regarding the rearing region, information regarding the signal relay device 10B, information regarding a notification determination condition, and the like. For example, the database storage unit 330 may include a storage device such as a hard disk drive (HDD) device or a solid state drive (SSD) device. Note that the database storage unit 330 may be a storage server that includes the storage device separate from the information processing server 30.

(Information Terminal 50)

The communication unit 510 is a communication interface including a communication device or the like for connection to the communication network 40, receives notification information from the information processing server 30, and transmits formation input to the manipulation unit 530 by the user to the information processing server 30. For example, the communication unit 510 may be a wired or wireless LAN-compatible communication device, a cable communication device that performs wired cable communication, or may be a communication device that performs mobile communication.

The control unit 520 includes a central processing unit (CPU), a read only memory (ROM), a random access memory (RAM), and the like and controls the overall operation of the information terminal 50. For example, on the basis of the notification information received from the information processing server 30, the control unit 520 may generate display for presenting notification from the information processing server 30 to the user. In addition, the control unit 520 may generate input information to be transmitted to the information processing server 30 on the basis of an input from the user.

The manipulation unit 530 includes input devices such as a touch panel, a keyboard, a button, a microphone, a switch, and a lever to which information is input and an input control circuit that generates an input signal on the basis of the input information. The manipulation unit 530 converts the input from the user into an input signal and delivers the input signal to the control unit 520.

The display unit 540 includes, for example, a display device such as a cathode ray tube (CRT) display device, a liquid crystal display device, or an organic electroluminescence (EL) display device. For example, the display unit 540 displays notification or the like generated on the basis of the notification information received from the information processing server 30.

1.3. Modification Example

Next, a modification example of the information processing system 1 according to the embodiment will be described. In the information processing system 1 according to the modification example, the signal transmission device 10A includes various sensors and measurement information by the various sensors is included in the transmission device identification signal transmitted by the signal transmission device 10A in the modification example.

The various sensors included in the signal transmission device 10A are specifically sensors that measure a state of the domestic animal 3 to which the signal transmission device 10A is attached or an environment state around the signal transmission device 10A. Thus, the information processing server 30 can also acquire information regarding the state of the domestic animal 3 to which the signal transmission device 10A is attached or information regarding the environment state around the domestic animal 3 in addition to information regarding the position of the domestic animal 3 to which the signal transmission device 10A is attached.

For example, the various sensors included in the signal transmission device 10A may be sensors measuring the state of the domestic animal 3, such as a body temperature sensor, a heart rate sensor, a blood sugar sensor, and a blood pressure sensor or may be sensors that measure the environment state around the domestic animal 3, such as a temperature sensor, a humidity sensor, a gas sensor, an atmospheric pressure sensor, an illuminance sensor, a vibration sensor such as an acceleration sensor and a gyro sensor, a geomagnetic sensor, a microphone, and an imaging device. In addition, the signal transmission device 10A may include the plurality of types of various sensors described above.

In addition, the information processing server 30 may determine a healthy state, a rearing stage, or the like of the domestic animal 3 on the basis of the measurement information of the various sensors included in the transmission device identification signal and may change the individual information regarding the domestic animal 3 stored in the database storage unit 330.

For example, the information processing server 30 may determine an estrous state, a delivery state, a hypothermia state, or a febrile state of the domestic animal 3 on the basis of information regarding a body temperature of the domestic animal 3 included in the transmission device identification signal and may rewrite the individual information regarding the domestic animal 3 with the information regarding the determined state. In addition, the information processing server 30 may determine an activity amount of the domestic animal 3 to which the signal transmission device 10A is attached from information regarding vibration of the signal transmission device 10A included in the transmission device identification signal and may rewrite the individual information regarding the domestic animal 3 with the information regarding the determined activity amount.

2. Information Processing Server

2.1. Configuration of Information Processing Server

Figure 4:
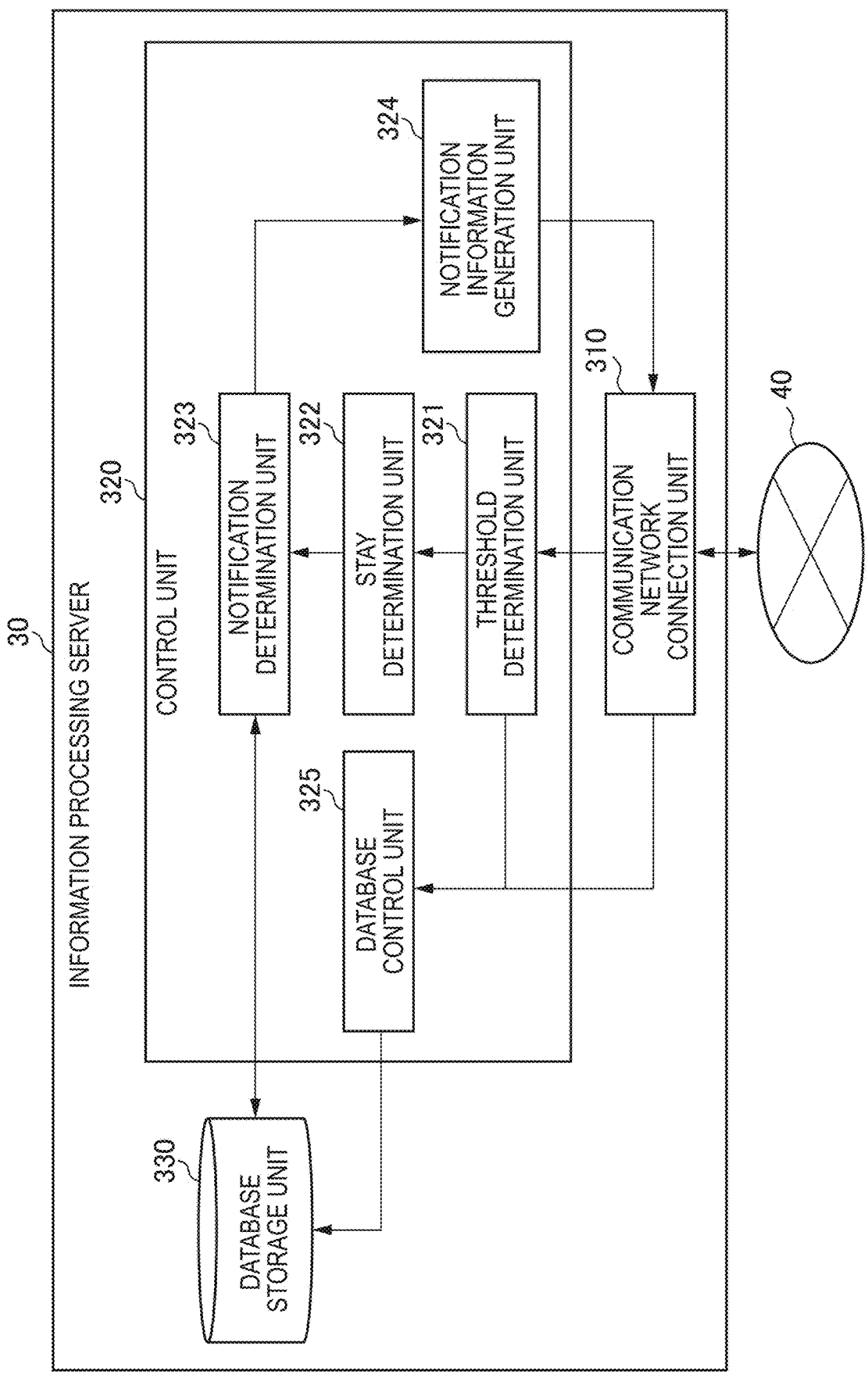
FIG. 4 is a block diagram illustrating a functional configuration of an information processing server according to an embodiment of the present disclosure.

Next, a functional configuration of the information processing server 30 according to the embodiment will be described in more detail with reference to FIGS. 4 to 11. FIG. 4 is a block diagram illustrating a functional configuration of the information processing server 30 according to the embodiment.

As illustrated in FIG. 4, the information processing server 30 includes a control unit 320 that includes a threshold determination unit 321, a stay determination unit 322, a notification determination unit 323, a notification information generation unit 324, and a database control unit 325, a communication network connection unit 310, and a database storage unit 330.

The communication network connection unit 310 includes a communication interface and a communication circuit which can be connected to the communication network 40 and receives a signal transmitted from the signal transmission device 10A (that is, the relay device identification signal) via the communication network 40, as described above. In addition, the communication network connection unit 310 transmits the notification information generated by the notification information generation unit 324 to the information terminal 50.

The threshold determination unit 321 determines whether or not the relay device identification signal is adopted in the determination of the stay of the domestic animal 3 on the basis of the radio wave intensity of the transmission device identification signal included in the relay device identification signal. For example, in a case in which the radio wave intensity of the transmission device identification signal received by the signal relay device 10B is less than the threshold, the threshold determination unit 321 performs control such that the transmission device identification signal is not adopted in the determination of the stay of the domestic animal 3. Thus, the information processing server 30 can determine the stay of the domestic animal 3 with higher precision by neglecting the transmission device identification signal with a low radio wave intensity as noise.

In addition, the threshold determination unit 321 may perform control such that the transmission device identification signal from the signal transmission device 10A located away from the signal relay device 10B is intentionally not adopted by controlling the threshold of the radio wave intensity of the transmission device identification signal used to determine the stay of the domestic animal 3. Since the communicable range of the signal relay device 10B is determined in accordance with the communication scheme between the signal transmission device 10A and the signal relay device 10B, the communicable range does not match the size of the rearing region corresponding to the signal relay device 10B in some cases. In these cases, the threshold determination unit 321 can control the threshold of the radio wave intensity so that a transmission device identification signal transmitted from a region deviating from the rearing region is not used to determine the stay of the domestic animal 3. Thus, even in a case in which the communicable range of the signal relay device 10B is broader than the rearing region corresponding to the signal relay device 10B, the threshold determination unit 321 can use only the transmission device identification signal transmitted from the rearing region to determine the stay of the domestic animal 3. Note that the threshold of the radio wave intensity used for the determination by the threshold determination unit 321 may be set by allowing the user to input the threshold.

The stay determination unit 322 determines the rearing region in which the domestic animal 3 to which the signal transmission device 10A is attached stays on the basis of the relay device identifier included in the relay device identification signal. Specifically, the stay determination unit 322 specifies the signal relay device 10B receiving the transmission device identification signal on the basis of the relay device identifier included in the relay device identification signal and determines that the domestic animal 3 to which the signal transmission device 10A is attached stays in the rearing region corresponding to the specified signal relay device 10B.

In addition, the stay of the domestic animal 3 is determined by the stay determination unit 322 at a predetermined time interval. For example, in a case in which the transmission device identification signal is received in the signal relay device 10B at least once for the predetermined time interval, the stay determination unit 322 determines that the domestic animal 3 corresponding to the transmission device identifier included in the transmission device identification signal stays in the rearing region corresponding to the signal relay device 10B. The stay determination unit 322 may determine the stay of the domestic animal 3 at a time interval different for each signal relay device 10B. Further, the stay of the domestic animal 3 may be determined by the stay determination unit 322 in only for predetermined period of time.

Figure 5:
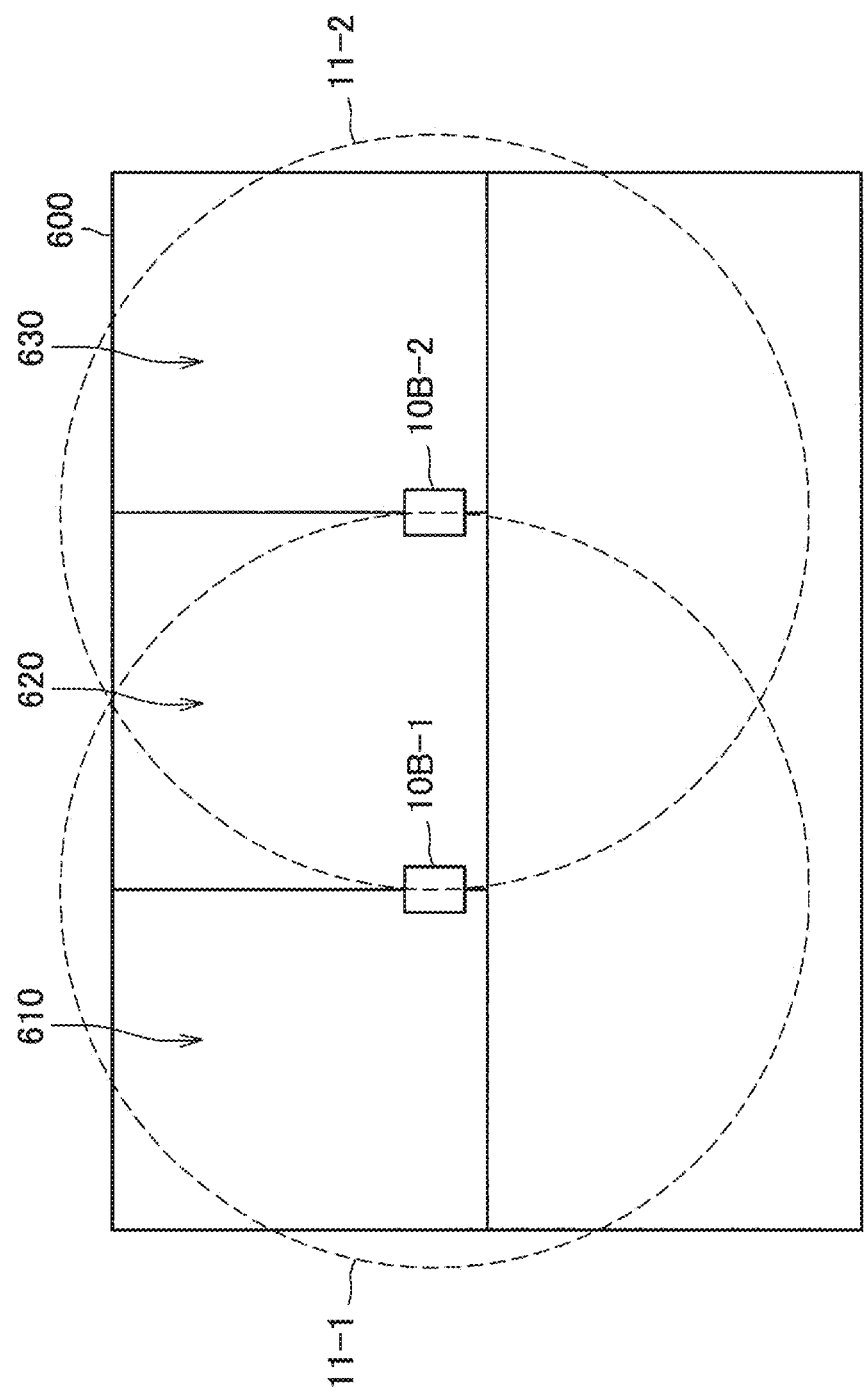
FIG. 5 is a plan view illustrating an example of a relation between communicable ranges of a plurality of signal relay devices and stalls segmented in a barn.

In addition, on the basis of the transmission device identification signals received in the plurality of signal relay devices 10B, the stay determination unit 322 may determine the rearing region in which the domestic animal 3 to which the signal transmission device 10A is attached stays. A specific example of the determination performed using the transmission device identification signals received in the plurality of signal relay devices 10B will be described with reference to FIG. 5. FIG. 5 is a plan view illustrating an example of a relation between communicable ranges of the plurality of signal relay devices 10B and stalls (that is, the rearing regions) segmented in a barn 600.

As illustrated in FIG. 5, a case in which the plurality of signal relay devices 10B-1 and 10B-2 are installed in the barn 600 in which the domestic animals 3 are reared will be exemplified.

As illustrated in FIG. 5, the barn 600 is segmented into stalls 610, 620, and 630 in which the domestic animals 3 are reared by walls, fences, partitions, and doors. The signal relay device 10B-1 is installed in a wall segmenting the stalls 610 and 620 and the signal relay device 10B-2 is installed in a wall segmenting the stalls 620 and 630. In addition, a communicable range 11-1 of the signal relay device 10B-1 reaches a range that includes rearing regions of the stalls 610 and 620 and a communicable range 11-2 of the signal relay device 10B-2 reaches a range that includes rearing regions of the stalls 620 and 630.

In this case, the stay determination unit 322 can determine whether the signal transmission device 10A is in one of the stalls 610, 620, and 630 which are the rearing regions narrower than the communicable ranges of the signal relay devices 10B-1 and 10B-2 in an intersection set of the signal relay devices 10B-1 and 10B-2 receiving the transmission device identification signal transmitted from the signal transmission device 10A.

Specifically, in a case in which the transmission device identification signal transmitted from the signal transmission device 10A is received by only the signal relay device 10B-1, the stay determination unit 322 can determine that the signal transmission device 10A is in the stall 610. In addition, in a case in which the transmission device identification signal transmitted from the signal transmission device 10A is received by only the signal relay device 10B-2, the stay determination unit 322 can determine that the signal transmission device 10A is in the stall 630.

Further, in a case in which the transmission device identification signal transmitted by the signal transmission device 10A is received by both the signal relay devices 10B-1 and 10B-2, the stay determination unit 322 can determine that the signal transmission device 10A is in the stall 620. That is, the stay determination unit 322 can determine that the signal transmission device 10A having transmitted the transmission device identification signal is in a region in which the communicable ranges of the signal relay devices 10B-1 and 10B-2 overlap each other. Here, in this case, times at which the transmission device identification signal is received by the signal relay devices 10B-1 and 10B-2 are assumed to be substantially the same time. Note that the times at which the transmission device identification signal is received by the signal relay devices 10B-1 and 10B-2 may be managed by each of the signal relay devices 10B-1 and 10B-2 or may be managed en bloc by the information processing server 30.

Accordingly, the stay determination unit 322 can determine presence of the signal transmission device 10A in the rearing region narrower than the communicable range of the signal relay device 10B by using the plurality of signal relay devices 10B-1 and 10B-2.

In addition, the stay determination unit 322 can determine presence of the signal transmission device 10A in the barn 600 which is a rearing region broader than the communicable ranges of the signal relay devices 10B-1 and 10B-2 in a union set of the signal relay devices 10B-1 and 10B-2 receiving the transmission device identification signal transmitted from the signal transmission device 10A.

Specifically, in a case in which the transmission device identification signal transmitted by the signal transmission device 10A is received by at least one of the signal relay devices 10B-1 and 10B-2, the stay determination unit 322 can determine that the signal transmission device 10A is in any location of the barn 600.

Accordingly, the stay determination unit 322 can also determine presence of the signal transmission device 10A in a rearing region broader than the communicable ranges of the signal relay devices 10B-1 and 10B-2 by using the plurality of signal relay devices 10B-1 and 10B-2.

The notification determination unit 323 determines whether or not to notify the user that the rearing region in which the domestic animal 3 stays does not match the rearing region corresponding to the rearing stage of the domestic animal 3. Specifically, the notification determination unit 323 compares the status information set in the rearing region in which the domestic animal 3 stays and which is determined by the stay determination unit 322 with the status information included in the individual information regarding the domestic animal 3 corresponding to the transmission device identifier included in the relay device identification information. In a case in which the status information set in the rearing region in which the domestic animal 3 stays does not match the status information included in the individual information regarding the domestic animal 3, the notification determination unit 323 may determine to perform the notification to the user.

Here, the individual information regarding the domestic animal 3 is, for example, information or the like regarding an individual identification number, an age of the moon, a sex, a species, a healthy state, and a reproductive cycle of the domestic animal 3. In addition, the status information regarding the domestic animal 3 is information indicating a stage in a rearing process of the domestic animal 3 calculated from the age of the moon, the sex, the species, the reproductive cycle, and the like of the domestic animal 3. The status information regarding the domestic animal 3 may be set automatically on the basis of the individual information regarding the domestic animal 3 or may be set by allowing the user to input the status information.

In addition, in a case in which the signal relay device 10B of the rearing region corresponding to the rearing stage of the domestic animal 3 does not receive the transmission device identification signal including the transmission device identifier corresponding to the domestic animal 3 for a predetermined time, the notification determination unit 323 may determine to perform the notification to the user. Specifically, the notification determination unit 323 first extracts the domestic animal 3 having predetermined status information from the database storage unit 330. Subsequently, the notification determination unit 323 determines whether or not the relay device identification signal including the transmission device identifier corresponding to the extracted domestic animal 3 and the relay device identifier of the signal relay device 10B corresponding to the rearing region in which the predetermined status information is set is received. In a case in which the relay device identification signal is not received for a predetermined time, the notification determination unit 323 may determine to perform notification to the user.

Note that the notification to the user by the notification determination unit 323 may be determined at a predetermined time interval. A relation between an interval of the notification determination by the notification determination unit 323 and an interval of the stay determination by the stay determination unit 322 is illustrated in FIG. 6. FIG. 6 is an explanatory diagram illustrating a relation between the interval of the notification determination by the notification determination unit 323 and the interval of the stay determination by the stay determination unit 322. Note that FIG. 6 illustrates a case in which the stay of the domestic animal 3 is determined in the intersection set of the reception of the plurality of signal relay devices 10B illustrated in FIG. 5.

As illustrated in FIG. 6, the stay determination unit 322 determines, at a time interval A, whether the domestic animal 3 stays in a rearing region corresponding to a first signal relay device and determines, at a time interval B, whether the domestic animal 3 stays in a rearing region corresponding to a second signal relay device. For example, in a case in which the transmission device identification signal is received at least once by the first signal relay device for the time interval A of the stay determination, the stay determination unit 322 determines that the domestic animal 3 corresponding to the transmission device identifier included in the transmission device identification signal stays in the rearing region corresponding to the first signal relay device.

On the other hand, the notification determination unit 323 determines the notification to the user at a time interval C longer than a sum of the time intervals A and B. For example, in a case in which the stay determination unit 322 determines that the domestic animal 3 stays in the rearing region at least once for the time interval C of the notification determination, the notification determination unit 323 determines whether or not the status information of the rearing region in which the domestic animal 3 stays matches the status information of the domestic animal 3 and determines the notification to the user. In addition, in a case in which the stay determination unit 322 determines that the domestic animal 3 does not stay in the rearing region in which the status information matching the status information regarding the domestic animal 3 is set for the time interval C of the notification determination, the notification determination unit 323 determines the notification to the user.

Note that by setting the time interval C to be longer than the sum of the time intervals A and B, whether the domestic animal 3 stays in the rearing region corresponding to the overlapping communicable ranges of the first and second signal relay devices can be determined even in a case in which a timing of the stay determination deviates between the first and second signal relay devices.

The notification information generation unit 324 generates notification information on the basis of the determination by the notification determination unit 323. Specifically, on the basis of the determination by the notification determination unit 323, the notification information generation unit 324 generates notification information for controlling notification to the information terminal 50 manipulated by the user who manages the domestic animal 3. The notification information may include, for example, identification information regarding the domestic animal 3 for which the rearing region in which the domestic animal 3 stays does not match the rearing region corresponding to the rearing stage and information regarding content of the mismatch of the rearing region. In addition, the notification information generation unit 324 may transmit the generated notification information to the information terminal 50 by push notification or a mail or may transmit the generated notification information to the information terminal 50 via a push notification server or a mail server that is separately provided.

The database storage unit 330 stores a database including the individual information regarding the domestic animal 3 including the status information, information regarding the rearing region corresponding to the rearing stage, information regarding the signal relay device 10B, and information regarding the notification determination condition by the notification determination unit 323. A specific example of the individual information regarding the domestic animal 3 (a milk cow is exemplified) stored in the database storage unit 330 is illustrated in FIGS. 7A and 7B. FIG. 7A is a table illustrating an example of basic information among pieces of individual information regarding the domestic animal 3. FIG. 7B is a table illustrating an example of information regarding breeding among the individual information regarding the domestic animal 3.

As illustrated in FIG. 7A, of the pieces of individual information regarding the domestic animal 3 stored in the database storage unit 330, for example, an identification number of the domestic animal 3, a nickname corresponding to a name, an age of the moon, an identification number and a nickname of a father bull, and an identification number and a nickname of a mother cow can be exemplified as basic information.

In addition, as illustrated in FIG. 7B, of the pieces of individual information regarding the domestic animal 3 stored in the database storage unit 330, an estrous sign, fertilization information, pregnancy diagnosis information, sex discrimination information, non-lactation information, non-pregnant days, and delivery information regarding the domestic animal 3 can be exemplified as information regarding breeding.

Figure 8:
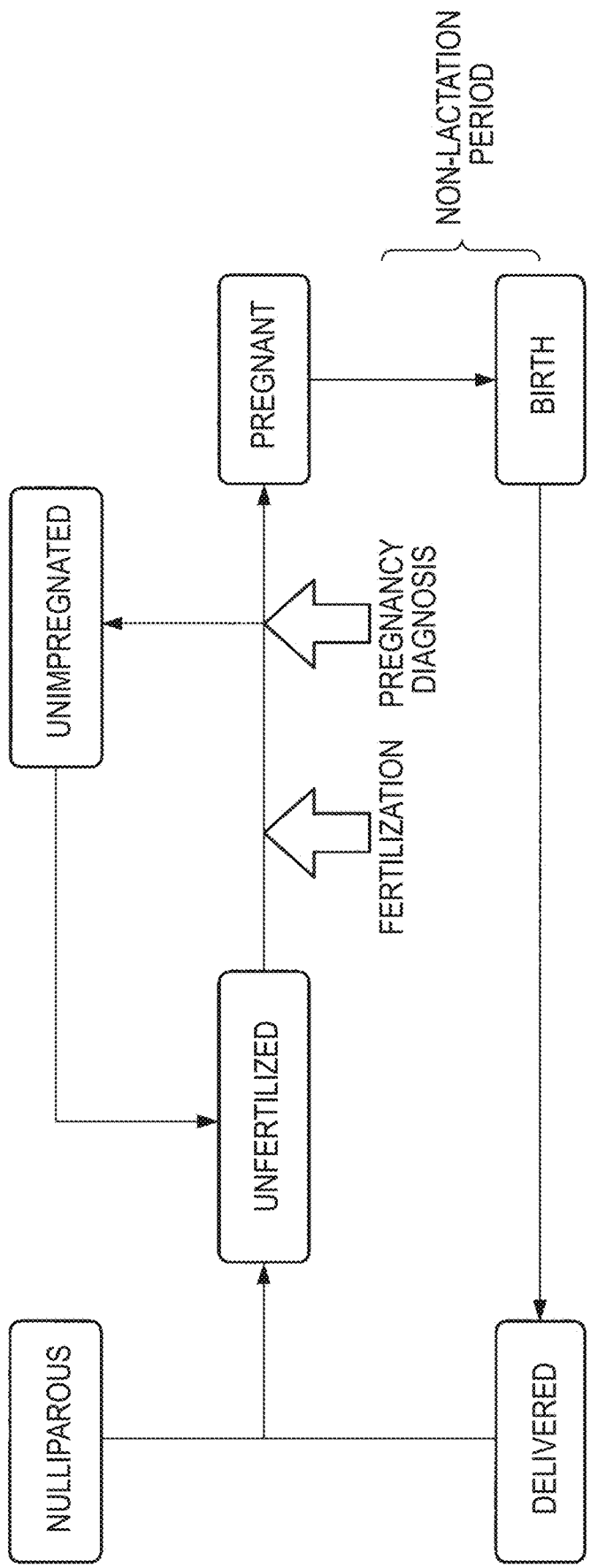
FIG. 8 is an explanatory diagram illustrating a breeding cycle of a milk cow.

The details of the information regarding the breeding will be described with reference to FIG. 8. FIG. 8 is an explanatory diagram illustrating a breeding cycle of a milk cow. Note that a breeding cycle of a milk cow will be described as an example of a rearing process of the domestic animal 3 herein, but the rearing process is not limited to the following example.

For example, as the rearing process of the domestic animal 3, a rearing process of the domestic animal 3 that includes a childhood, a mature period, an old-age period, and the like in accordance with an age, a rearing process of the domestic animal 3 that includes an onset period, a progress period, a recovery period, a prognosis period, and the like in accordance with a progress of disease, or a rearing process of the domestic animal 3 that includes a spring period, a summer period, a fall period, and a winter period in accordance with progress of the seasons can be exemplified. Information indicating the stages of the rearing process is stored as status information in the database storage unit 330 and is used for each process of the information processing server 30.

As illustrated in FIG. 8, a milk cow that has not given birth is referred to as a nulliparous cow and a milk cow that has given birth is referred to as a delivered cow. In either case of the cow, a pregnant state is realized from an unfertilized state via occurrence of an estrous sign, fertilization, and pregnancy diagnosis. Note that, in a case in which the cow is diagnosed as being unimpregnanted in the pregnancy diagnosis, the fertilization and the pregnancy diagnosis are performed again. In addition, milking of the cow in the pregnant state is restricted in preparation for delivery for 60 days before an expected date of delivery. A period in which the milking is restricted is also referred to as a non-lactation period. The cow that has given birth after the non-lactation period returns to the unfertilized state again as a delivered cow. The milk cow breeds in the rearing process at the foregoing cycle.

That is, the information regarding the breeding illustrated in FIG. 7B is used as status information indicating that the corresponding domestic animal 3 (that is, a milk cow) indicates a stage of the foregoing breeding cycle (that is, the rearing process).

For example, the estrous sign of the domestic animal 3 is information regarding the degree of an estrous sign in an unfertilized state. The fertilization information is information regarding a date on which fertilization is carried out, the number of times the fertilization is carried out, and a bull for fertilization. The pregnancy diagnosis information is information regarding a date on which pregnancy diagnosis is carried out after the fertilization and a diagnosis result. The sex discrimination information is information regarding a male or a female of an embryo of a pregnant cow. The non-lactation information is information regarding a schedule of a non-lactation period and whether or not the cow is in a non-lactating state. The non-pregnant days are information regarding the number of days elapsed after delivery. The delivery information is information an expected date of delivery of a pregnant cow and a history of deliveries.

The individual information regarding the domestic animal 3 including the status information is frequently updated as information used to manage the domestic animal 3 by the user who manages the domestic animal 3 to be stored in the database storage unit 330.

In addition, the information regarding the rearing region stored in the database storage unit 330 is illustrated in FIG. 9. FIG. 9 is a table illustrating an example of the information regarding the rearing region corresponding to the rearing stage.

As illustrated in FIG. 9, as the information regarding the rearing region stored in the database storage unit 330, for example, a name of the rearing region, status information regarding domestic animals reared in the rearing region, and an identification number (equivalent to the relay device identifier) of the signal relay device 10B installed in the rearing region and corresponding to the rearing region can be exemplified. In addition, in a case in which the plurality of signal relay devices 10B are installed in the rearing region, the information regarding the rearing region includes information regarding whether it is determined whether the domestic animals 3 stay using the transmission device identification signals received by the signal relay devices 10B in the union set or whether it is determined whether the domestic animals 3 stay using the transmission device identification signals in the intersection set (that is, a combination of the signal relay devices).

In addition, the information regarding the signal relay device 10B stored in the database storage unit 330 is illustrated in FIG. 10. FIG. 10 is a table illustrating an example of information regarding the signal relay device 10B.

As illustrated in FIG. 10 as the information regarding the signal relay device 10B stored in the database storage unit 330, for example, the identification number of the signal relay device 10B which is the relay device identifier, the name of the signal relay device 10B, latitude and longitude indicating a position at which the signal relay device 10B is installed, a radio wave intensity of the transmission device identification signal used to determine the stay of the domestic animal 3, a time interval at which the stay of the domestic animal is determined, and the identification number and the name of the rearing region corresponding to the signal relay device 10B, and the like can be exemplified.

Further, the information regarding the notification determination condition stored in the database storage unit 330 is illustrated in FIG. 11. FIG. 11 is a table illustrating an example of information regarding notification determination condition.

As illustrated in FIG. 11, as the information regarding the notification determination condition stored in the database storage unit 330, for example, an identification number and a name of an alert notification transmitted on the notification determination condition, a time interval and a period of time at which the notification determination of the alert notification is performed, the status information or the identification number of the domestic animal 3 which is a notification determination target, and an alert direction in which directivity of the notification determination is set can be exemplified.

Note that the alert direction is information for setting whether the alert notification is performed with regard to one of absence and presence. Specifically, whether the notification is determined is set in the alert direction in a case in which it is determined the domestic animal 3 which is a notification determination target is absent or a case in which it is determined that there is the domestic animal 3 other than the domestic animal 3 which is the notification determination target. Since any information regarding the notification determination condition can be set by the user, the information processing server 30 can perform various notifications in accordance with content of the information regarding the notification determination condition.

The database control unit 325 controls the individual information regarding the domestic animal 3 stored in the database storage unit 330. For example, the database control unit 325 changes the individual information regarding the domestic animal 3 stored in the database storage unit 330 on the basis of an input from the information terminal 50 of the user who manages the domestic animal 3.

In addition, the database control unit 325 may control the individual information regarding the domestic animal 3 stored in the database storage unit 330 on the basis of a reception frequency of the transmission device identification signal in the signal relay device 10B. Specifically, in a case in which the transmission device identifier included in the transmission device identification signal, the rearing region corresponding to the signal relay device 10B receiving the transmission device identification signal, and the reception frequency of the transmission device identification signal satisfy predetermined conditions, the database control unit 325 may change the individual information regarding the domestic animal 3 corresponding to the transmission device identifier included in the transmission device identification signal.

For example, in a case in which the signal relay device 10B installed in the rearing region corresponding to a predetermined rearing stage receives a predetermined transmission device identification signal at a predetermined frequency, the database control unit 325 may change the status information included in the individual information regarding the domestic animal 3 corresponding to the transmission device identifier included in the transmission device identification signal. In this case, the database control unit 325 may change the status information regarding the domestic animal 3 so that the rearing stage of the domestic animal 3 proceeds to a subsequent rearing stage in the rearing process of the domestic animal 3 including the plurality of rearing stages. For example, the database control unit 325 may change "pregnant state" to "non-lactation state" in the rearing process of the milk cow.

In addition, as described in the foregoing modification example, in a case in which the signal transmission device 10A includes various sensors, the database control unit 325 may change the individual information regarding the domestic animal 3 on the basis of the measurement information regarding the state of the domestic animal 3 measured by the various sensors or the measurement information regarding the environment state around the domestic animal 3.

For example, the database control unit 325 may change the information regarding breeding such as the estrous state or the delivery state among the pieces of individual information regarding the domestic animal 3 on the basis of information regarding the body temperature of the domestic animal 3 measured by the temperature sensor included in the signal transmission device 10A. In addition, the database control unit 325 may change the information regarding breeding such as the estrous state or the delivery state among the pieces of individual information regarding the domestic animal 3 on the basis of information regarding an activity amount of the domestic animal 3 measured by the vibrations sensor included in the signal transmission device 10A.

2.2. Operation of Information Processing Server

Next, a specific example of an operation executed by the information processing server 30 will be described with reference to FIGS. 12 to 17. Note that the information processing server 30 may perform at least one or more of the first to third operation examples to be described below alone or may perform the operation examples in parallel.

First Operation Example

Figure 12:
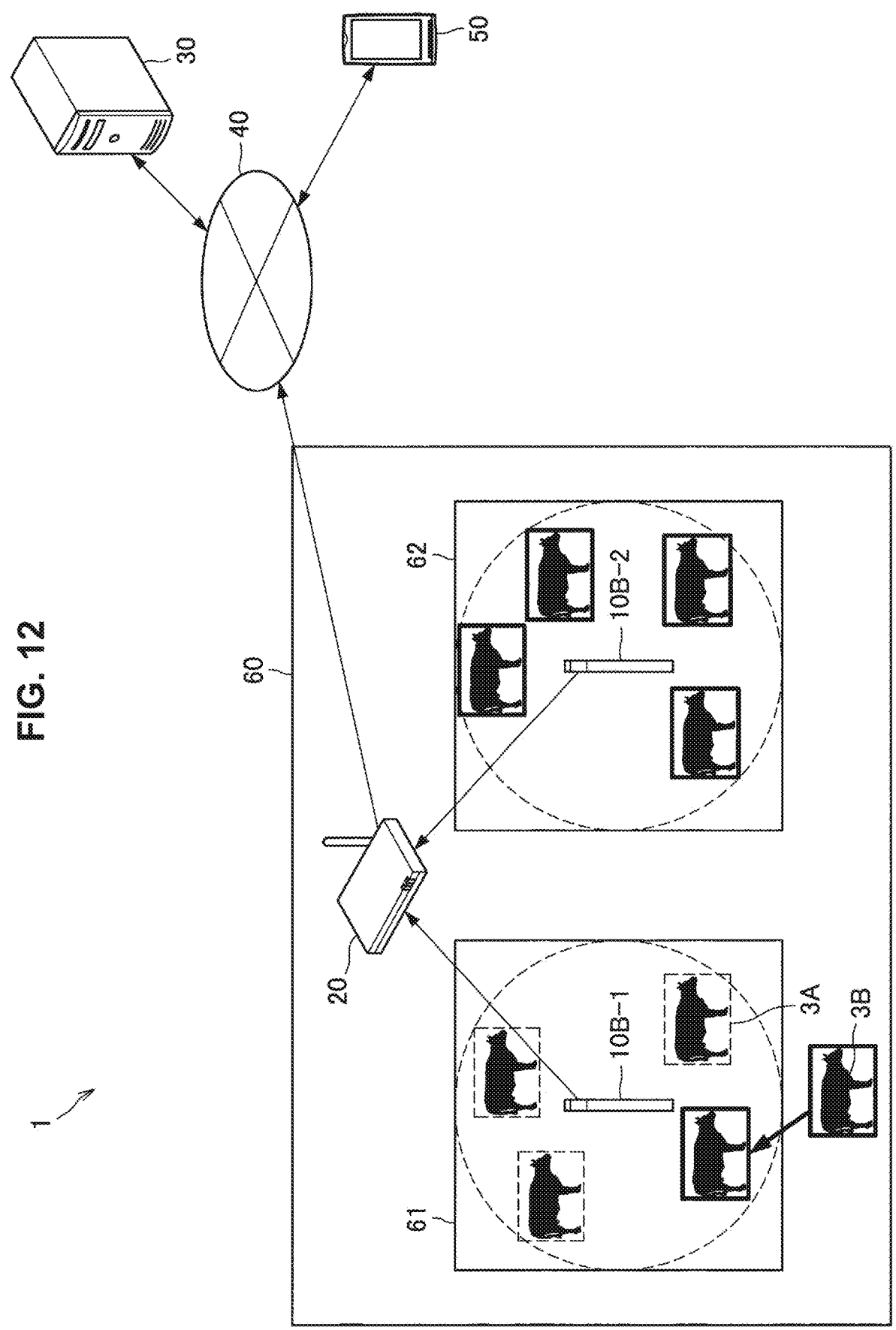
FIG. 12 is an explanatory diagram illustrating a first operation example of the information processing server.
Figure 13:
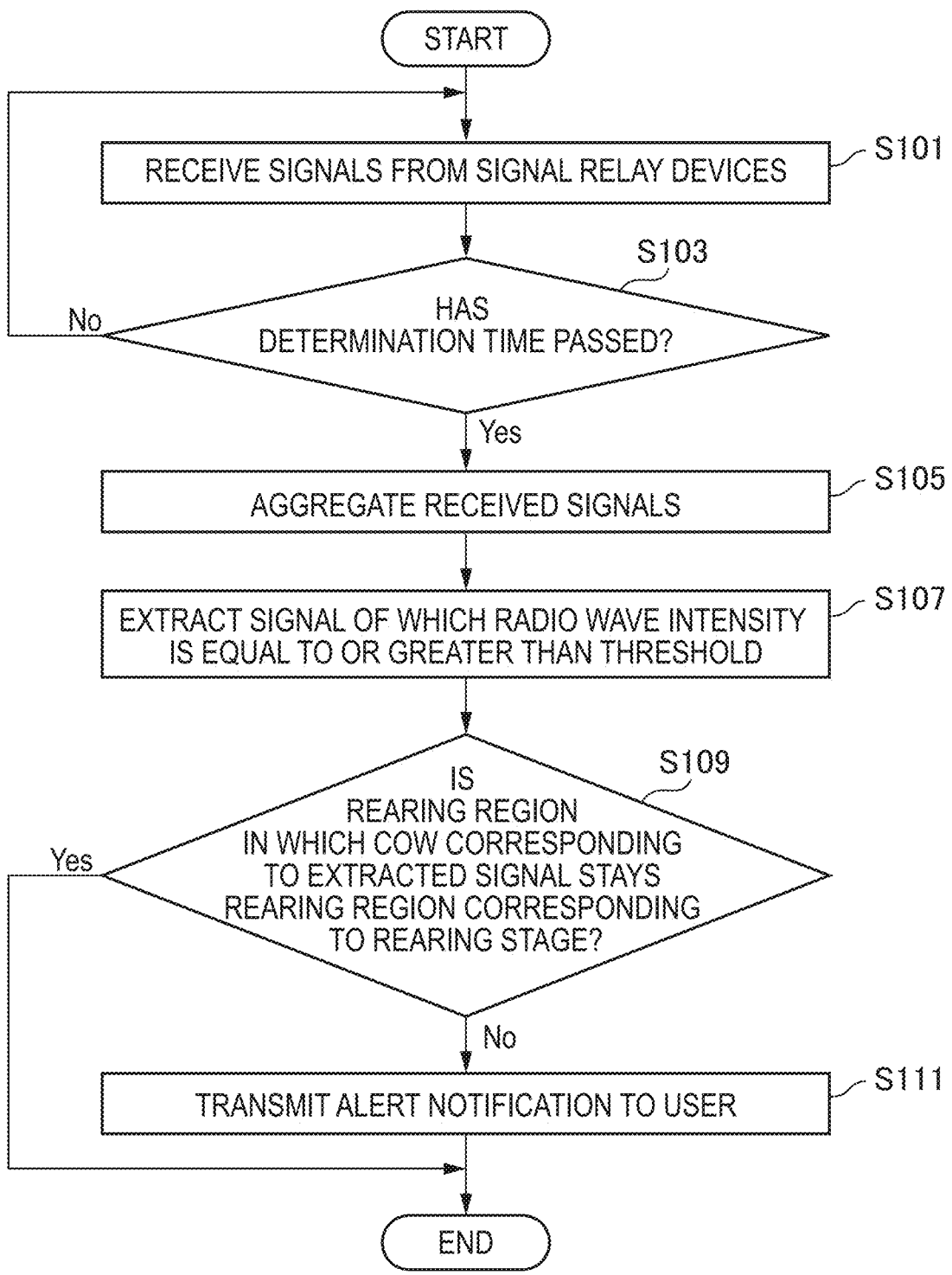
FIG. 13 is a flowchart for describing the first operation example of the information processing server.

First, a first operation example of the information processing server 30 will be described with reference to FIGS. 12 and 13. FIG. 12 is an explanatory diagram illustrating the first operation example of the information processing server 30. FIG. 13 is a flowchart for describing the first operation example of the information processing server 30.

As illustrated in FIG. 12, the first operation example of the information processing server 30 is an operation example in which the information terminal 50 of the user is notified of an alert in a case in which a cow 3B to which the signal transmission device 10A is attached enters a rearing region other than the rearing region corresponding to the rearing stage.

For example, a cow 3A which is in non-lactation and the cow 3B which is not in non-lactation are reared in different barns 61 and 62. Therefore, in a case in which the cow 3B which is not in the non-lactation enters the barn 61 in which the cow 3A which is in the non-lactation is reared, the information processing server 30 causes the information terminal 50 to display notification indicating that the cow 3B which is not in the non-lactation enters the barn 61 on the basis of the fact that the transmission device identification signal from the signal transmission device 10A attached to the cow 3B is received by the signal relay device 10B-1.

An operation of the information processing server 30 in this case will be described. As illustrated in FIG. 13, the control unit 320 first receives the relay device identification signals from the signal relay devices 10B-1 and 10B-2 via the communication network connection unit 310 (S101). After the control unit 320 receives the relay device identification signals until a time interval of the notification determination passes (Yes in S103), the control unit 320 aggregates the received relay device identification signals (S105), and the control unit 320 extracts the relay device identification signals of which the radio wave intensity is equal to or greater than the threshold (S107).

Subsequently, the control unit 320 determines that the cow corresponding to the transmission device identifier included in the extracted relay device identification signal stays in the rearing region corresponding to the signal relay device 10B-1 corresponding to the relay device identifier. Further, the control unit 320 compares the status information regarding the cow corresponding to the transmission device identifier included in the extracted relay device identification signal with the status information set in the rearing region and determines whether or not the rearing region in which the cow stays is the rearing region corresponding to the rearing stage of the cow (S109). In a case in which the rearing region is not the rearing stage corresponding to the rearing stage (No in S109), the control unit 320 determines the notification to the user and the notification information generation unit 324 generates notification information for controlling the notification to the user and transmits the notification information to the information terminal 50 (S111). Conversely, in a case in which the rearing region is the rearing stage corresponding to the rearing stage (Yes in S109), the control unit 320 ends the operation without determining the notification to the user.

Second Operation Example

Figure 14:
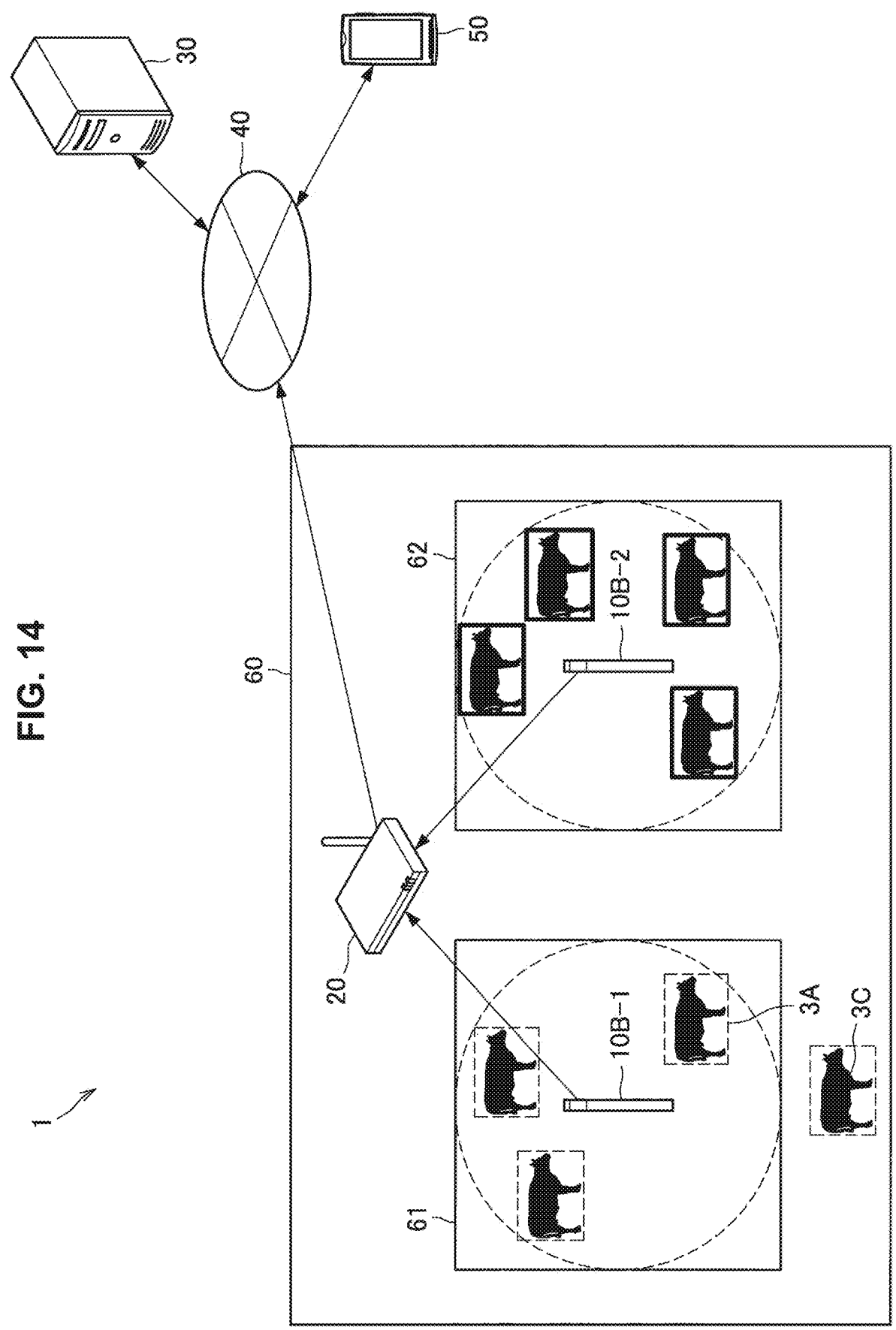
FIG. 14 is an explanatory diagram illustrating a second operation example of the information processing server.
Figure 15:
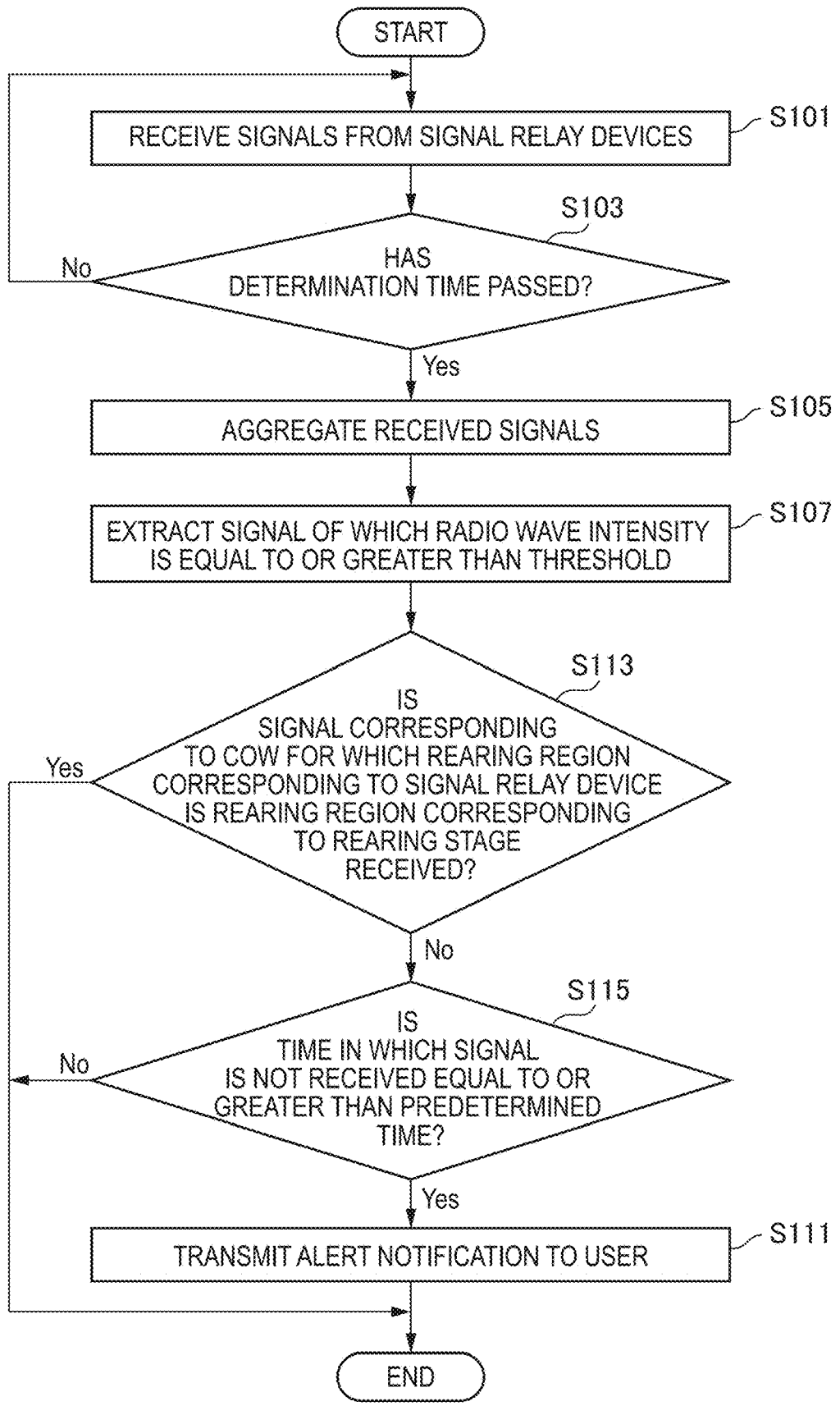
FIG. 15 is a flowchart for describing the second operation example of the information processing server.

Next, a second operation example of the information processing server 30 will be described with reference to FIGS. 14 and 15. FIG. 14 is an explanatory diagram illustrating the second operation example of the information processing server 30. FIG. 15 is a flowchart for describing the second operation example of the information processing server 30.

As illustrated in FIG. 14, the second operation example of the information processing server 30 is an operation example in which the information terminal 50 of the user is notified of an alert in a case in which a cow 3C to which the signal transmission device 10A is attached does not stay in the rearing region corresponding to the status information for a predetermined time.

For example, the cow 3A which is in non-lactation and the cow 3B which is not in non-lactation are reared in different barns 61 and 62. Here, in a case in which the cow 3C which is in the non-lactation does not stay for the predetermined time in the barn 61 in which the cow 3A which is the non-lactation is reared, the information processing server 30 causes the information terminal 50 to display notification indicating that the cow 3C which is in the non-lactation is absent on the basis of the fact that the transmission device identification signal from the signal transmission device 10A attached to the cow 3C is not received for the predetermined time by the signal relay device 10B-1.

An operation of the information processing server 30 in this case will be described. As illustrated in FIG. 15, the control unit 320 first receives the relay device identification signals from the signal relay devices 10B-1 and 10B-2 via the communication network connection unit 310 (S101). The control unit 320 receives the relay device identification signals until a time interval of the notification determination passes (Yes in S103), the control unit 320 aggregates the received relay device identification signals (S105), and the control unit 320 extracts the relay device identification signals of which the radio wave intensity is equal to or greater than the threshold (S107).

Subsequently, the control unit 320 determines whether or not the transmission device identification signal including the transmission device identifier corresponding to the cow that has the status information matching the status information regarding the rearing region is received by the signal relay device 10B-1 corresponding to the rearing region in which the predetermined status information is set (S113). In a case in which the transmission device identification signal is not received (No in S113), the control unit 320 determines whether or not a time in which the transmission device identification signal is not received is equal to or greater than a predetermined time (S115). In a case in which the time in which the transmission device identification signal is not received is equal to or greater than the predetermined time (Yes in S115), the control unit 320 determines the notification to the user and the notification information generation unit 324 generates notification information for controlling the notification to the user and transmits the notification information to the information terminal 50 (S111).

Conversely, in a case in which the transmission device identification signal is received (Yes in S113) or a case in which the time in which the transmission device identification signal is not received is less than the predetermined time (No in S115), the control unit 320 ends the operation without determining the notification to the user.

Third Operation Example

Figure 16:
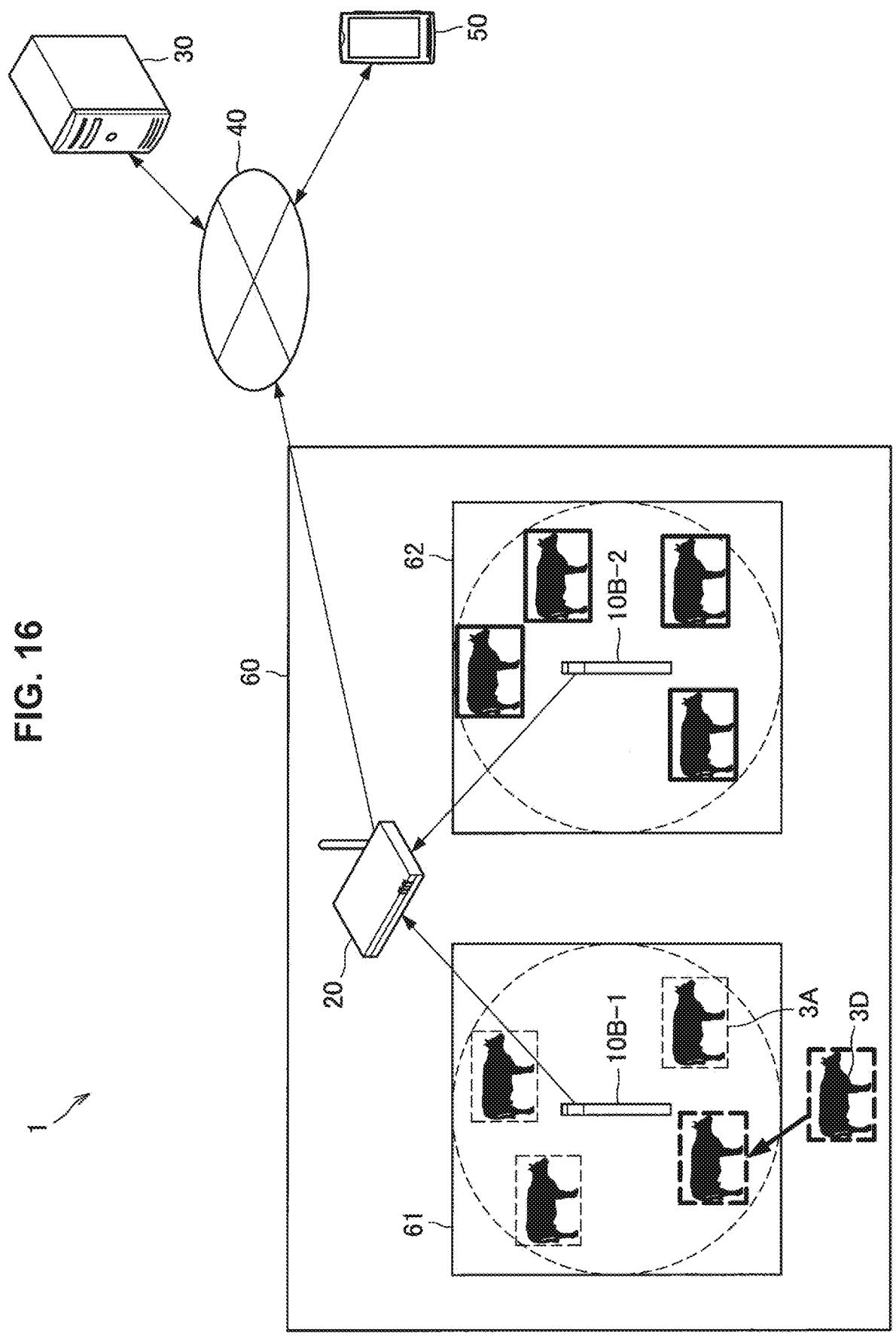
FIG. 16 is an explanatory diagram illustrating a third operation example of the information processing server.
Figure 17:
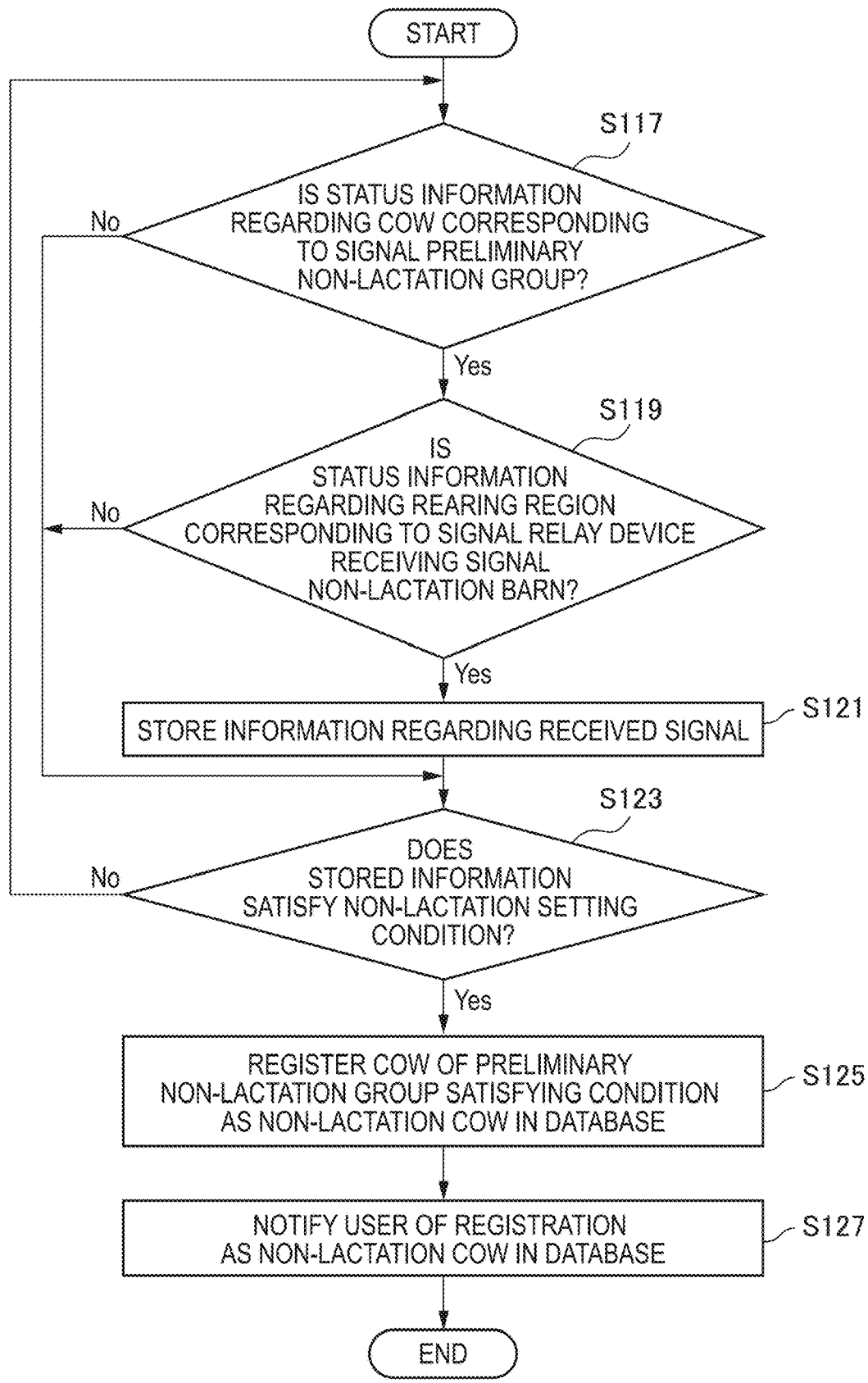
FIG. 17 is a flowchart for describing the third operation example of the information processing server.

Further, a third operation example of the information processing server 30 will be described with reference to FIGS. 16 and 17. FIG. 16 is an explanatory diagram illustrating the third operation example of the information processing server 30. FIG. 17 is a flowchart for describing the third operation example of the information processing server 30.

As illustrated in FIG. 16, the third operation example of the information processing server 30 is an operation example in which the individual information of a specific cow 3D to which the signal transmission device 10A is attached is changed in a case in which a frequency at which the specific cow 3D enters the rearing region corresponding to a predetermined rearing stage satisfies a predetermined condition.

For example, a cow in a pregnant state is the cow 3D of a preliminary non-lactation group transitioning to the cow 3A which is in the non-lactation state over time. Therefore, in a case in which the cow 3D of the preliminary non-lactation group frequently enters the barn 61 in which the cow 3B in the non-lactation state is reared, the information processing server 30 changes the status information included in the individual information regarding the cow 3D of the preliminary non-lactation group and registers the cow 3D of the preliminary non-lactation group as the cow 3A in the non-lactation state. In addition, the information processing server 30 causes the information terminal 50 to display notification indicating the change in the individual information regarding the cow 3D of the preliminary non-lactation group.

An operation of the information processing server 30 in this case will be described. Note that since the operation of S101 to S107 until the relay device identification signal of which the radio wave intensity is equal to or greater than the threshold is extracted are the same as the operation described in the first operation example, the description thereof will be omitted herein.

As illustrated in FIG. 17, after S107, the control unit 320 determines whether or not the status information regarding the cow corresponding to the transmission device identifier included in the relay device identification signal is the preliminary non-lactation group (S117). Note that the control unit 320 may set the status information regarding a predetermined cow may be set as the preliminary non-lactation group on the basis of the individual information of the cow. For example, the control unit 320 sets the status information regarding the cow of which a subsequent expected date of delivery is within predetermined days (for example, within 60 days) from a current date as the preliminary non-lactation group on the basis of delivery information included in the individual information regarding the cow. In a case in which the status information is the preliminary non-lactation group (Yes in S117), the control unit 320 determines whether or not the rearing region corresponding to the relay device identifier included in the relay device identification signal is the rearing region of the barn 61 of the cow 3A in the non-lactation state (S119). In a case in which the rearing region corresponding to the relay device identifier is the rearing region of the barn 61 (Yes in S119), the control unit 320 temporarily stores the transmission device identifier included in the relay device identification signal and a reception time or the like of the transmission device identification signal in a storage buffer (S121).

Conversely, in a case in which the status information regarding the cow is not the preliminary non-lactation group (No in S117) or a case in which the rearing region corresponding to the relay device identifier is the rearing region of the barn 61 (No in S119), the control unit 320 does not store the transmission device identifier included in the relay device identification signal and the reception time or the like of the transmission device identification signal in the storage buffer. The control unit 320 performs the foregoing operation on each relay device identification signal and continuously stores the information in the storage buffer.

Here, in a case in which a predetermined number of pieces of information are stored in the storage buffer, the control unit 320 determines whether or not the stored information group satisfies a preset status change condition (S123). As the status change condition, specifically, a non-lactation setting condition can be used. The non-lactation setting condition is, for example a condition or the like in which the transmission device identification signal transmitted from the signal transmission device 10A attached to the cow 3D of the preliminary non-lactation group is continuously received every 5 hours for 2 days by the signal relay devices 10B-1 installed in the barn 61 of the cow in the non-lactation state.

In a case in which the stored information group satisfies the non-lactation setting condition (Yes in S123), the control unit 320 changes the status information of the cow 3D of the preliminary non-lactation group corresponding to the transmission device identifier satisfying the non-lactation setting condition and registers the cow as the cow in the non-lactation state which is a subsequent rearing stage in the database (S125). Thus, the control unit 320 can change the status information of the cow 3D of the preliminary non-lactation group. In addition, the notification information generation unit 324 generates the notification information for controlling the notification indicating registration as the cow in the non-lactation state in the database and transmits the notification information to the information terminal 50 (S127). Here, the status change condition and the non-lactation setting condition are not limited to the foregoing examples. The status change condition and the non-lactation setting condition can be set voluntarily by the user.

2.3. Display Example in Information Terminal

Here, display in the information terminal 50 managed by the user will be described with reference to FIGS. 18 to 23.

Figure 18:
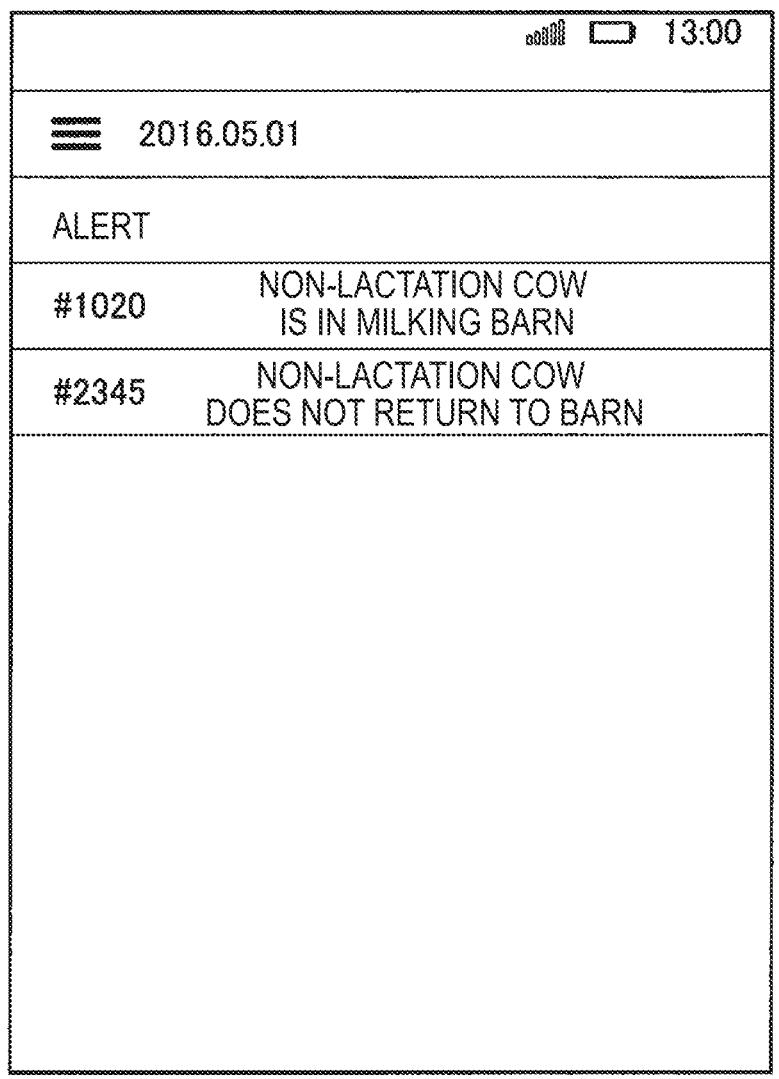
FIG. 18 is an explanatory diagram illustrating an example of display of alert notification.

First, an example of alert notification displayed on the information terminal 50 is illustrated in FIG. 18 on the basis of the notification information generated in the information processing server 30. FIG. 18 is an explanatory diagram illustrating an example of display of alert notification.

In the display illustrated in FIG. 18, two pieces of alert notification "#1020 Non-lactation cow is in milking barn" and "#2345 Non-lactation cow does not return to barn" are shown along with a date "2016. 05. 01." Here, "#1020" and "#2345" are each transmission device identifiers corresponding to the cows which are alert notification targets.

That is, "#1020 Non-lactation cow is in milking barn" indicates that the status information is "non-lactation" and the cow with the identification number "#1020" stays in "milking barn" which is the rearing region in which the status information of "milking cow" is set. In addition, "#2345 Non-lactation cow does not return to barn" indicates that the identification number is "#2345" and the transmission device identification signal including the transmission device identifier corresponding to the cow of which the status information is "non-lactation cow" is not received by the signal relay device 10B installed in the "barn" which is the rearing region in which the status information of "non-lactation cow" is set.

Next, an example of display related to the individual information regarding the domestic animal 3 displayed on the information terminal 50 is illustrated in FIG. 19. FIG. 19 is an explanatory diagram illustrating an example of the display related to the individual information of the domestic animal 3. Note that in the display illustrated in FIG. 19, for example, transition is possible by selecting an item corresponding to each alert notification illustrated in FIG. 18.

In the display related to the individual information of the domestic animal 3 illustrated in FIG. 19, "non-lactation" (that is, milking cow) is shown as the status information of the domestic animal 3 of which the identification number is "#1020" and "grazing" is shown as information indicating the rearing region in which the domestic animal 3 stays. Further, as the basic information regarding the domestic animal 3 in which the identification number is "#1020", an individual identification number granted by the government is "113901020," a nickname is "Win birth," a date of birth is "2010. 5. 10," a nickname and an identification number of a father bull is "#2023" and "Young sky," and a nickname and an identification number of a mother cow is "#3025" and "Green earth" are shown.

Next, FIG. 20 illustrates an example of display shown on the information terminal 50 when the threshold of the radio wave intensity of the transmission device identification signal used to determine the stay of the domestic animal 3 is controlled from the information terminal 50. FIG. 20 is an explanatory diagram illustrating an example of display for controlling the threshold of the radio wave intensity of a transmission device identification signal.

As illustrated in FIG. 20, in a case in which the threshold of the radio wave intensity of the transmission device identification signal is controlled, the rearing region corresponding to the signal relay device 10B controlling the threshold is first selected. In the left display of the FIG. 20, items of "milking barn," "non-lactation (holiday) barn," and "nurturing barn" are shown as the rearing regions (that is, barns). Note that a rearing region can also be newly set by selecting an item of "Add barn (area)" from this display.

In a case in which the item of "milking barn" is selected in the left display of FIG. 20, the display transitions to the middle display of FIG. 20. In the middle display of FIG. 20, information regarding the rearing region of "milking barn"

is shown. Specifically, the name of the rearing region which is "milking barn," the set status information which is "milking cow," and the relay device identifiers of the corresponding signal relay devices 10B which are "12356" and "12357" are shown. In addition, from an item of "Test communication of relay devices," the display can transition to display for controlling the threshold of the radio wave intensity of the transmission device identification signal of each signal relay device 10B.

Note that by selecting each item from this display, it is also possible to change the information set in each item. In addition, by selecting the item of "Add relay device," it is also possible to additionally set the signal relay device 10B corresponding to the rearing region.

In a case in which the item of "Test communication of relay devices" is selected in the middle display of FIG. 20, the display transitions to the right display of FIG. 20. In the right display of FIG. 20, the threshold of the radio wave intensity of the transmission device identification signal in each signal relay device 10B and the number of cows determined to say are shown.

Specifically, in the low part of the display, "sensitivity" which is the threshold of the radio wave intensity is shown to be controllable in a slide switch for each signal relay device 10B. In addition, the number of cows determined to stay in the case of the "sensitivity" is shown for each piece of status information regarding "milking cow," "non-lactation cow," "nurturing cow," and "holiday cow." In addition, the number of cows determined to stay in the rearing region of "milking barn" by taking a union set or an intersection set of the transmission device identification signals received from the signal relay devices 10B is shown in the upper portion of the display.

Here, the number of cows determined to stay is frequently updated. Therefore, it is possible to confirm the number of cows determined to stay with regard to the threshold of the radio wave intensity and a change in the status information while controlling the threshold of the radio wave intensity in the slid switch. Accordingly, the user can cause the rearing region corresponding to the signal relay device 10B to match the communicable range of the signal relay device 10B by controlling the threshold of the radio wave intensity such that the number of cows determined to stay and the status information actually match the number of cows staying in the rearing region of "milking barn" and the status information.

Figure 21:
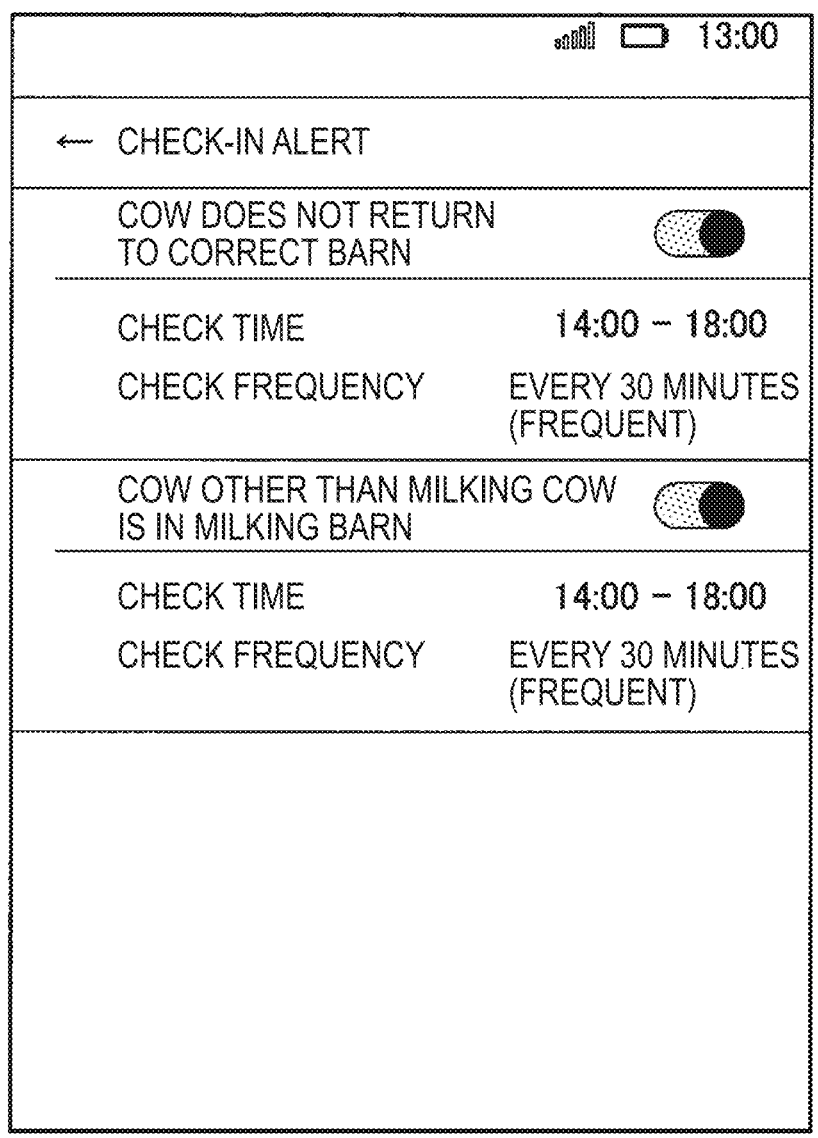
FIG. 21 is an explanatory diagram illustrating an example of display related to setting of alert notification.

Next, an example of display regarding setting of the alert notification displayed on the information terminal 50 is illustrated in FIG. 21. FIG. 21 is an explanatory diagram illustrating an example of display related to setting of alert notification.

In the display related to the setting of the alert notification illustrated in FIG. 21, some of the notification determination conditions of the alert notification set by the user in advance can be changed. Specifically, for alert notification conditions of titles "Cow does not return to correct barn" or "Cow other than milking cow is in milking barn" in the display related to the setting of the alert notification, switches for setting whether to perform determination in the alert notification conditions are provided. In addition, items of a period of time and a time interval of the notification determination on the alert notification conditions are shown. The user can easily control presence or absence of the alert notification determination by controlling the setting switches of the alert notification determination. In addition, the user can easily control the period of time and the time interval of the alert notification determination by selecting each of the items of the period of time and the time interval.

Figure 22:
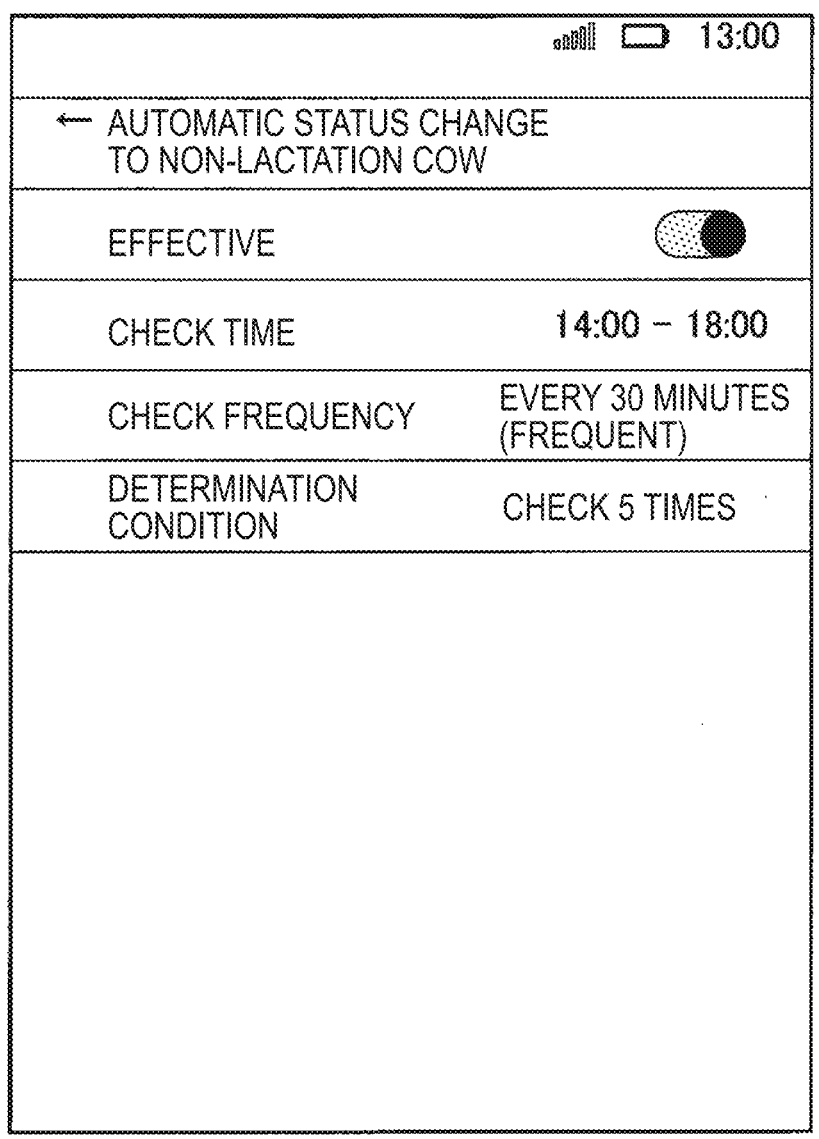
FIG. 22 is an explanatory diagram illustrating an example of setting display of a non-lactation setting condition.

Next, a setting screen of the non-lactation setting condition on which the status information proceeds from "preliminary non-lactation group" to "non-lactation cow" is illustrated in FIG. 22. FIG. 22 is an explanatory diagram illustrating an example of setting display of a non-lactation setting condition.

In the setting display illustrated in FIG. 22, items of a period of time (a check time) in which reception of the transmission device identification signal corresponding to the cow of which the status information is "preliminary non-lactation group," a frequency of configuration (a check frequency), and "determination condition" which is the threshold for changing the status information are shown as the change conditions to the status information of "cow in lactation." Note that the user can also change each condition by selecting the item.

According to the specific non-lactation setting condition illustrated in FIG. 22, confirmation of whether or not the transmission device identification signal corresponding to the cow of which the status information is "preliminary non-lactation group" is received every 30 minutes for a period of time from 14:00 to 18:00 is set. In addition, in a case in which the reception of the transmission device identification signal is confirmed 5 times, a change in the status information of the corresponding cow from "preliminary non-lactation group" to "non-lactation cow" is set.

In addition, an example of display for notifying that the status information regarding the cow proceeds from "preliminary non-lactation group" to "non-lactation cow" is illustrated in FIG. 23. FIG. 23 is an explanatory diagram illustrating an example of display for notifying that status information of a cow is changed.

In the display illustrated in FIG. 23, since the non-lactation setting condition is satisfied along with display of a time and a date, display for notifying that the status information regarding the cow of which the identification number is "#1234" is changed to "non-lactation cow" is shown. The display illustrated in FIG. 23 may be, for example, simple display of notification by a mail or display by push notification.

2.4. Hardware Configuration Example of Information Processing Server

Figure 24:
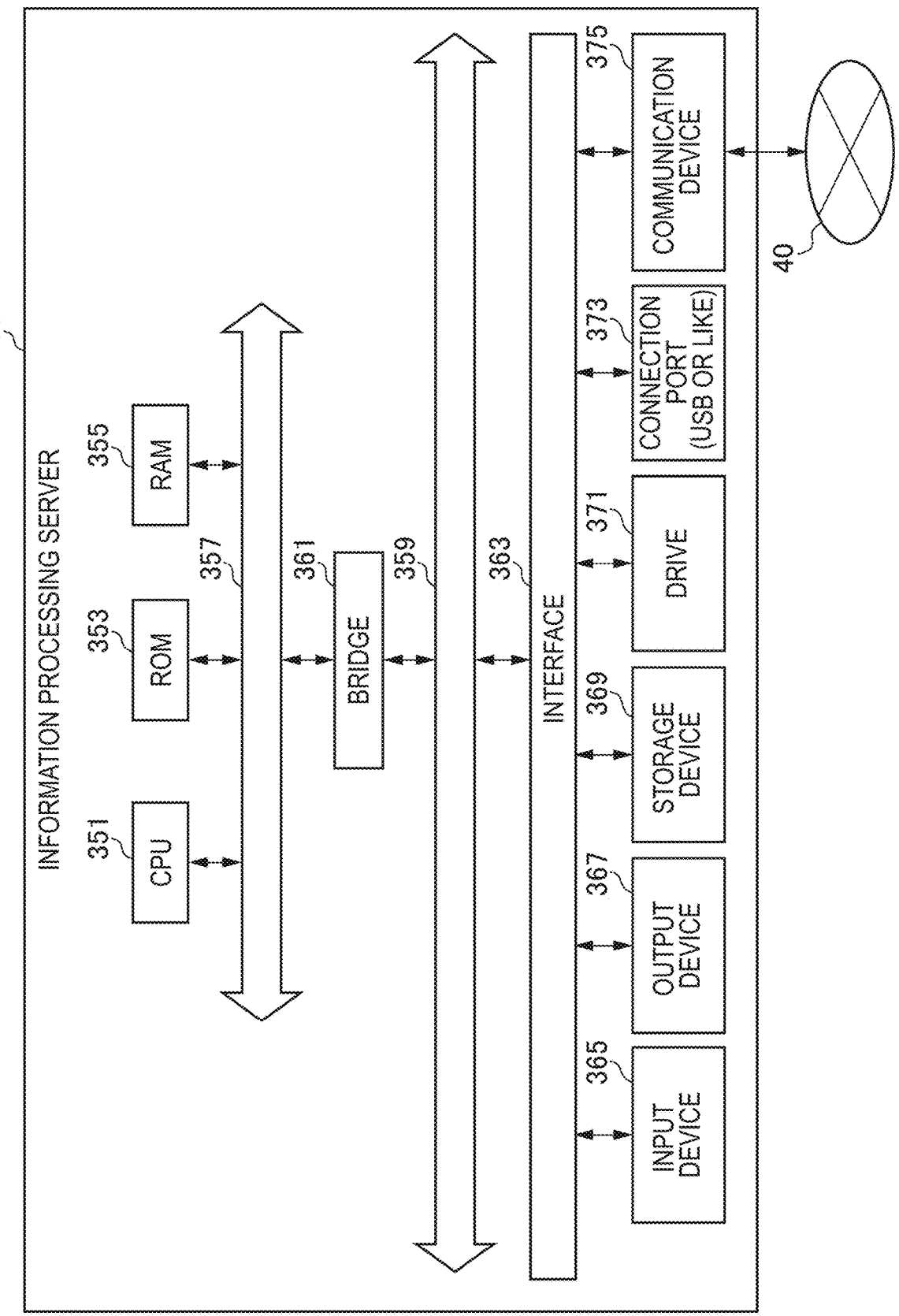
FIG. 24 is a block diagram illustrating an example of a hardware configuration of an information processing server according to an embodiment of the present disclosure.

Next, a hardware configuration of the information processing server 30 according to the present embodiment will be described with reference to FIG. 24. FIG. 24 is a block diagram of a hardware configuration example of the information processing server 30 according to the present embodiment. Information processing by the information processing server 30 according to the present embodiment is realized through the cooperation of software and hardware.

As shown in FIG. 24, the information processing server 30 includes a central processing unit (CPU) 351, read only memory (ROM) 353, random access memory (RAM) 355, a bridge 361, internal buses 357 and 359, an interface 363, an input device 365, an output device 367, a storage device 369, a drive 371, a connection port 373, and a communication device 375.

The CPU 351 functions as an operation processing device and a control device, and controls the overall operation of the information processing server 30 in accordance with various programs stored in the ROM 353 and the like. The ROM 353 stores programs and operation parameters used by the CPU 351, and the RAM 355 temporarily stores programs used in the execution by the CPU 351, and parameters and the like that change appropriately in that execution. For example, the CPU 351 may execute the functions of the control unit 320.

The CPU 351, the ROM 353, and the RAM 355 are connected together by the bridge 361 and the internal buses 357 and 359 and the like. The CPU 351, the ROM 353, and the RAM 355 are also connected to the input device 365, the output device 367, the storage device 369, the drive 371, the connection port 373, and the connection device 375, via the interface 363.

The input device 365 includes an input device into which information is input, such as a touch panel, a keyboard, a mouse, a button, a microphone, a switch, and a lever. The input device 365 also includes an input control circuit that generates an input signal on the basis of the input information, and outputs the generated input signal to the CPU 351, and the like.

The output device 367 includes a display device such as a cathode ray tube (CRT) display device, a liquid crystal display device, or an organic electro-luminescence (organic EL) display device, for example. Furthermore, the output device 367 may include a voice output device such as a speaker and headphones.

The storage device 369 is a storage device of the information processing server 30 for storing data. The storage device 369 may include a storage medium, a storage device that stores data in a storage medium, a readout device that reads out data from a storage medium, and deletion device that deletes stored data. The storage device 369 may also execute the function of the database storage unit 330 and the like.

The drive 371 is a reader/writer for a storage medium, and is built into, or externally attached to, the information processing server 30. For example, the drive 371 can read information stored on an inserted removable storage medium such as a magnetic disk, an optical disk, a magneto optical disk, or semiconductor memory, and outputs this information to the RAM 353. The drive 371 is also able to write information to a removable storage medium.

The connection port 373 is a connection interface formed by, for example, a USB port, an Ethernet (registered trademark) port, an IEEE802.11 standard port, and a connection port for connecting an externally connected device such as an optical audio terminal.

The communication device 375 is a communication interface formed by, for example, a communication device or the like for connecting to the communication network 40. The communication device 375 may also be a wired or wireless LAN compatible communication device, or a cable communication device that performs wired communication via a cable. The communication device 375 may execute the function of the communication network connection unit 310 and the like.

Also, it is also possible to create a computer program for causing hardware such as the CPU, ROM, and RAM built into the information processing server 30 to display functions equivalent to the functions of the components of the information processing server according to the present embodiment described above. Also, a storage medium that stores the computer program is also provided.

3. Conclusion

As described above, the information processing system 1 according to the embodiment of the present disclosure can ascertain the stay of the corresponding domestic animal 3 by receiving the transmission device identification signal from the signal ending device 10A in the signal relay device 10B installed in each rearing region of the pasture 60. In addition, the information processing system 1 can determine whether or not the domestic animal 3 stays in the rearing region corresponding to the rearing stage by referring to the individual information regarding the domestic animal 3. Further, the information processing system 1 can generate the notification information for causing the information terminal 50 managed by the user to display the alert notification in a case in which the rearing region in which the domestic animal 3 stays does not match the rearing region corresponding to the rearing stage of the domestic animal 3. Accordingly, according to the present disclosure, the user can more easily manage the domestic animal 3.

Note that the case in which the management target to which the signal transmission device 10A is attached is the domestic animal 3 has been exemplified above, but the technology according to the present disclosure is not limited to the foregoing example.

For example, as the management targets, pets, humans such as infants and the aged who are caring targets, and moving machines such as unmanned vehicles and drones of which movement is automatically controlled can be exemplified. In addition, the foregoing management target has a plurality of management states corresponding to the rearing stages in the foregoing examples and are managed to correspond to the plurality of management states. The information processing system 1 according to the embodiment of the present disclosure can also manage the management target by attaching the signal transmission device 10A on the management target and ascertaining match between the region in which the management target stays and the region corresponding to the management state, as described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing server, in which a transmission signal, transmitted from a signal transmission device attached to a domestic animal and relayed to the information processing server by at least one or more signal relay devices installed to correspond to a rearing region of the domestic animal, includes a transmission device identifier for specifying the signal transmission device and a relay device identifier for specifying the signal relay device, the information processing server including:

a control unit configured to determine whether or not the domestic animal stays in a rearing region corresponding to a rearing stage on a basis of the relay device identifier and individual information regarding the domestic animal corresponding to the transmission device identifier; and a notification information generation unit configured to generate notification information for controlling notification in an information terminal on a basis of the determination by the control unit.

(2)

The information processing server according to (1), in which the control unit determines that the rearing region corresponding to the signal relay device specified with the relay device identifier is the rearing region in which the domestic animal stays.

(3)

The information processing server according to (1), in which the control unit determines whether or not the domestic animal stays in the rearing region corresponding to the rearing stage on a basis of status information regarding the domestic animal included in the individual information regarding the domestic animal corresponding to the transmission device identifier and status information set in the rearing region corresponding to the signal relay device.

(4)

The information processing server according to (3), in which the control unit determines the status information set in the rearing region of the domestic animal on a basis of the relay device identifier for specifying the signal relay device receiving the transmission signal.

(5)

The information processing server according to (3) or (4), in which the status information is information indicating a stage of a rearing process of the domestic animal.

(6)

The information processing server according to any one of (2) to (5), in which the notification information generation unit generates the notification information in a case in which the control unit determines that the rearing region in which the domestic animal stays is different from the rearing region corresponding to the rearing stage of the domestic animal.

(7)

The information processing server according to any one of (2) to (5), in which the notification information generation unit generates the notification information in a case in which the control unit determines that the domestic animal does not stay in the rearing region corresponding to the rearing stage for a predetermined time.

(8)

The information processing server according to any one of (1) to (7), in which the control unit changes status information regarding the domestic animal to which the signal transmission device having transmitted the transmission signal is attached on a basis of the transmission and a status changing condition.

(9)

The information processing server according to (8), in which a rearing process of the domestic animal includes a plurality of rearing stages, and the control unit changes the status information regarding the domestic animal so that the rearing stage of the domestic animal proceeds to a subsequent rearing stage.

(10)

The information processing server according to any one of (1) to (9), in which the control unit determines the stay of the domestic animal on a basis of the transmission signal with a radio wave intensity equal to or greater than a threshold.

(11)

The information processing server according to (10), in which the threshold is controlled in accordance with an input from the information terminal.

(12)

The information processing server according to any one of (1) to (11), in which the control unit determines the stay of the domestic animal at each predetermined time interval.

(13)

The information processing server according to any one of (1) to (12), in which the control unit determines the stay of the domestic animal within a range of a predetermined period of time.

(14)

The information processing server according to any one of (1) to (13), in which the control unit determines the stay of the domestic animal on a basis of each of the transmission signals received in a plurality of the signal relay devices.

(15)

The information processing server according to any one of (1) to (14), in which the transmission signal is transmitted using power generated in a power generation device included in the signal transmission device.

(16)

The information processing server according to any one of (1) to (15), in which the transmission signal includes measurement information measured by a sensor unit included in the signal transmission device, and on a basis of the measurement information, the control unit changes status information regarding the domestic animal to which the signal transmission device is attached.

(17)

The information processing server according to any one of (1) to (16), in which the notification information includes information for specifying the domestic animal determined to stay by the control unit.

(18)

The information processing server according to any one of (1) to (17), in which the individual information regarding the domestic animal includes information regarding reproduction of the domestic animal.

(19)

An information processing system including:

a signal transmission device attached to a domestic animal and configured to transmit a transmission signal including a transmission device identifier;

at least one or more signal relay devices installed to correspond to a rearing region of the domestic animal and configured to add a relay device identifier to the received transmission signal to relay the transmission signal to an information processing server; and the information processing server including a control unit configured to determine whether or not the domestic animal stays in a rearing region corresponding to a rearing stage on a basis of the relay device identifier and individual information regarding the domestic animal corresponding to the transmission device identifier, and a notification information generation unit configured to generate notification information for controlling notification in an information terminal on a basis of the determination by the control unit.

(20)

An information processing method, in which a transmission signal, transmitted from a signal transmission device attached to a domestic animal and relayed to an information processing server by at least one or more signal relay devices installed to correspond to a rearing region of the domestic animal, includes a transmission device identifier for specifying the signal transmission device and a relay device identifier for specifying the signal relay device, the information processing method including:

determining whether or not the domestic animal stays in a rearing region corresponding to a rearing stage, by an arithmetic processing device, on a basis of the relay device identifier and individual information regarding the domestic animal corresponding to the transmission device identifier; and generating notification information for controlling notification in an information terminal on a basis of the determination.

REFERENCE SIGNS LIST 1 information processing system
3 domestic animal
10A signal transmission device
10B signal relay device
20 communication network connection device
30 information processing server
40 communication network
50 information terminal
60 pasture
61, 62 barn
310 communication network connection unit
320 control unit
321 threshold determination unit
322 stay determination unit
323 notification determination unit
324 notification information generation unit
325 database control unit
330 database storage unit

The invention claimed is:

1. An information processing server, wherein a transmission signal, transmitted from a signal transmission device attached to a domestic animal and relayed to the information processing server by one or more signal relay devices installed in one or more rearing regions of the domestic animal, includes a transmission device identifier for specifying individual information regarding the domestic animal and for specifying the signal transmission device and a relay device identifier for specifying the one or more signal relay devices, the information processing server comprising:

a controller configured to determine whether or not the domestic animal stays in a rearing region corresponding to a rearing stage appropriate for the domestic animal, based on the relay device identifier and the transmission device identifier specifying the individual information regarding the domestic animal; and a notification information generator configured to generate notification information and to transmit the notification information to an information terminal upon a determination by the controller that the rearing region in which the domestic animal stays is not appropriate for the domestic animal.

2. The information processing server according to claim 1, wherein the controller determines that the rearing region corresponding to the signal relay device specified with the relay device identifier is the rearing region in which the domestic animal stays.

3. The information processing server according to claim 1, wherein the controller determines whether or not the domestic animal stays in the rearing region corresponding to the rearing stage appropriate for the domestic animal based on status information regarding the domestic animal included in the individual information regarding the domestic animal corresponding to the transmission device identifier and status information set for a rearing region corresponding to the signal relay device.

4. The information processing server according to claim 3, wherein the controller determines the status information set in the rearing region of the domestic animal based on the relay device identifier for specifying the signal relay device receiving the transmission signal.

5. The information processing server according to claim 3, wherein the status information is information indicating a stage of a rearing process of the domestic animal.

6. The information processing server according to claim 2, wherein the notification information generator generates the notification information in a case in which the controller determines that the rearing region in which the domestic animal stays is different from a rearing region corresponding to the rearing stage appropriate for the domestic animal.

7. The information processing server according to claim 2, wherein the notification information generator generates the notification information in a case in which the controller determines that, after waiting a predetermined time period, a transmission signal has not been received from the signal transmission device attached to the domestic animal.

8. The information processing server according to claim 1, wherein the controller changes status information regarding the domestic animal corresponding to the transmission signal based on the transmission signal and a status changing condition.

9. The information processing server according to claim 8, wherein
a rearing process of the domestic animal includes a plurality of rearing stages, and
the controller changes the status information regarding the domestic animal so that a current rearing stage of the domestic animal proceeds to a subsequent rearing stage of the domestic animal.

10. The information processing server according to claim 1, wherein the controller determines a stay of the domestic animal based on a radio wave intensity of the transmission signal being equal to or greater than a threshold.

11. The information processing server according to claim 10, wherein the threshold is controlled in accordance with an input from the information terminal.

12. The information processing server according to claim 1, wherein the controller determines a predetermined time interval for each stay region of the domestic animal.

13. The information processing server according to claim 1, wherein the controller determines a stay of the domestic animal within a range of a predetermined period of time.

14. The information processing server according to claim 1, wherein the controller determines a stay of the domestic animal based on transmission signals received in a plurality of signal relay devices.

15. The information processing server according to claim 1, wherein the transmission signal is transmitted using power generated in a power generation device included in the signal transmission device.

16. The information processing server according to claim 1, wherein
the transmission signal includes measurement information measured by a sensor included in the signal transmission device, and
based on the measurement information, the controller changes status information regarding the domestic animal to which the signal transmission device is attached.

17. The information processing server according to claim 1, wherein the notification information includes information for specifying the domestic animal.

18. The information processing server according to claim 1, wherein the individual information regarding the domestic animal includes information regarding a reproduction history of the domestic animal.

19. An information processing system comprising:
an information processing server;
a signal transmission device configured to be attached to a domestic animal and configured to transmit a transmission signal including a transmission device identifier that specifies individual information regarding the domestic animal;
one or more signal relay devices configure to be installed in one or more rearing regions of the domestic animal, and configured to add a relay device identifier to a received transmission signal and to relay the received transmission signal with the relay device identifier to the information processing server,
wherein the information processing server includes:
a controller configured to determine whether or not the domestic animal stays in a rearing region corresponding to a rearing stage appropriate for the domestic animal, based on the relay device identifier and the transmission device identifier specifying the individual information regarding the domestic animal, and
a notification information generator configured to generate notification information and to transmit the notification information to an information terminal based on a determination by the controller that the rearing region in which the domestic animal stays is not appropriate for the domestic animal, based on one or both of the relay device identifier and the transmission device identifier.

20. An information processing method of an information processing server, comprising:
receiving a transmission signal, transmitted from a signal transmission device attached to a domestic animal and relayed to the information processing server by one or more signal relay devices installed in one or more rearing regions of the domestic animal, wherein the transmission signal includes a transmission device identifier for specifying individual information regarding the domestic animal and for specifying the signal transmission device and a relay device identifier for specifying the one or more signal relay devices;
determining whether or not the domestic animal stays in a rearing region corresponding to a rearing stage appropriate for the domestic animal, by an arithmetic processing device of the information processing server, based on the relay device identifier and the transmission device identifier specifying the individual information regarding the domestic animal; and
generating notification information and transmitting the notification information to an information terminal based on a determination that the rearing region in which the domestic animal stays is not appropriate for the domestic animal.

* * * * *